United States Patent [19]

Vulcan et al.

[11] Patent Number: 5,799,072
[45] Date of Patent: Aug. 25, 1998

[54] TELECOMMUNICATIONS CALL MANAGEMENT SYSTEM

[75] Inventors: Isaac Vulcan; Gideon Barak, both of Raanana, Israel

[73] Assignee: CallManage, Raanana, Israel

[21] Appl. No.: 610,617

[22] Filed: Mar. 4, 1996

Related U.S. Application Data

[63] Continuation-in-part of Ser. No. 505,024, Jul. 21, 1995, Pat. No. 5,764,741.
[51] Int. Cl.⁶ .................................................. H04M 15/00
[52] U.S. Cl. .................... 379/114; 379/115; 379/130; 379/113; 379/133
[58] Field of Search ........................ 379/111, 112, 379/113, 114, 115, 121, 130, 131, 133, 134, 140

[56] References Cited

U.S. PATENT DOCUMENTS

| | | | |
|---|---|---|---|
| 4,585,904 | 4/1986 | Mincone | 379/112 |
| 4,656,657 | 4/1987 | Hunsicker | 379/131 |
| 5,185,785 | 2/1993 | Funk et al. | 379/115 |
| 5,515,425 | 5/1996 | Penzies | 379/113 |
| 5,519,769 | 5/1996 | Weinberger et al. | 379/112 |
| 5,553,124 | 9/1996 | Brinskele | 379/114 |
| 5,606,602 | 2/1997 | Johnson | 379/114 |

OTHER PUBLICATIONS

John Jainschigg; "Think Globally, Act Locally"; Teleconnect, May 1995, pp. 32–33.

*Primary Examiner*—Curtis Kuntz
*Assistant Examiner*—Vijay Shankar
*Attorney, Agent, or Firm*—Wilson Sonsini Goodrich & Rosati

[57] ABSTRACT

A call management system is disclosed that may interface with an existing PBX or may be utilized as a separate unit. In a preferred embodiment, the call management system includes a tariff data server, a local client computer and one or more line units. The tariff data server holds tariff data of service providers and transmits the tariff data to the local client computer via a communications link. The communications link can include the Internet making the tariff data widely available. Each line unit couples a telephone set to the telephone line provided by the LEC. The local client computer maintains a communications link with each line unit. Each line unit can be coupled to more than one LEC, allowing cost optimizations to take into account the LEC in addition to long distance carriers. The line unit intercepts the dialed digits and transmits them to the local client computer. The local client computer determines an optimum route for the call based on various parameters and transmits the complete dialing string back to the line unit which does the actual dialing of the digits. The local client computer maintains a client database of tariffs of telephone service providers and determines, from information in its client database, which telephone service provider or providers to utilize to execute the telephone call. The client database is updated on a periodic basis via, for example, electronic mail or FTP over the Internet. The local client computer also includes a carrier performance monitoring unit and call accounting unit. In another preferred embodiment, the call management system includes a telephone dialing unit and a data server which interfaces to existing PBX equipment.

28 Claims, 13 Drawing Sheets

TELECOMMUNICATIONS CALL MANAGEMENT SYSTEM

REFERENCE TO RELATED APPLICATIONS

This application is a continuation in part of application Ser. No. 08/505,024, filed Jul. 21, 1995, now U.S. Pat. No. 5,764,741.

FIELD OF THE INVENTION

The present invention relates to telecommunications and more specifically, to a call management system for providing least cost routing, associated call accounting and carrier performance monitoring for telephone systems that are connected to analog telephone or trunk lines.

BACKGROUND OF THE INVENTION

The United States is divided into a plurality of contiguous, non-overlapping exchanges, referred to as Local Access Transport Areas (LATAs), each of which is served by a local telephone company. Telephone calls originating and terminating within the same exchange, referred to as intraLATA calls, are handled end-to-end by a local, intraLATA, telephone company referred to as the Local Exchange Carrier (LEC). Calls originating within one exchange or in a state or foreign country and terminating in a different exchange, potentially in a different state or foreign country, referred to as inter-exchange calls, are handled at each end by the intraLATA company or LEC that services the originating and the terminating exchanges. These inter-exchange calls are carried between the intraLATA companies by one or more inter-exchange carriers, known as long distance carriers.

A caller who wishes to select an inter-exchange carrier must dial special access codes that are assigned to each inter-exchange carrier and once connected, must sometimes also dial a personal identification code and the number of the called party to have the call completed. With the proliferation of inter-exchange carriers, carrier selection is often difficult for a telephone communication system user. The user may be unaware of which inter-exchange carrier, available in his/her area, is the most economical for a particular time of day, which inter-exchange carrier serves the user's telephone communication system or what access codes are appropriate for the particular inter-exchange carriers available to the user's telephone communication system.

During the last few years, the competition between telephone companies (also known as "operating companies" or "service providers") for the telephone subscriber business has increased markedly. This competition is most evident in the multiplicity of tariffs from each carrier, which vary not only between destinations but also according to the nature of the contract signed between the subscriber and the telephone company, the time of day and the length of call. In addition, competition exists between intra-exchange service providers.

Though this competition gives the customer an opportunity for saving money, the customer rarely fully benefits because of the complexity and the variety of existing tariffs. For example, tariffs may vary due to the time of day, on weekends, holidays, according to the call destination, method of payment and any time limited promotions. The situation may be further complicated by special limited discounts or other incentives offered by the telephone companies, the entry of new telephone companies to new markets and the grade of service requested (i.e., voice quality, connection delays and first time connection establishment success).

The entry of new money saving services, such as Fax Store and Forward and call-back services, the availability of alternate services offered by private networks using their own PBX and the usage of corporate networks are additional factors affecting the cost of the call. Consequently, the customer has to contend with a huge amount of information in order to determine how to make the least expensive telephone call. Because of the complexity of the charging schemes, a cost optimization on a per call basis is nearly impossible for a subscriber to perform by themselves.

Call management systems are applications suitable not just for large businesses with high call volumes but are also suitable for small office/home office (SOHO) as well. The bewildering array of service providers available and the existence of a complicated tariff structure combine to create a need for a system to manage the placement of telephone calls for SOHO applications.

U.S. Pat. No. 4,791,665 to Bogart et al. describes a telephone communication system (PBX) with the capability of automatically selecting one of a plurality of inter-exchange carriers. The system includes a database containing access code data associated with the inter-exchange carriers, user authorization codes and information about the various inter-exchange carrier billing rates based on time of day and destination. The PBX scans the database and reroutes the originating call to one of the other inter-exchange carriers having a cheaper tariff for the particular destination at the specific time of day. The PBX sends out the inter-exchange carrier access code, the user's personal identification code and the called party number dialed by the user to complete the call.

U.S. Pat. No. 5,425,084 to Brinskele describes a computer controlled telephone communication system which includes a plurality of digital switches each located in different charge zones. Each digital switch is coupled to a file server which determines which of the digital switches to use in order to ensure the lowest possible cost for the call.

U.S. Pat. No. 5,420,914 to Blumhardt describes a real time selection of one of a plurality of inter-exchange carriers which automatically selects the carrier having the least expensive toll at the time the call is made and reroutes the call accordingly. Blumhardt is used in conjunction with an advanced intelligent network (AIN) in a public switched telephone network (PSTN).

U.S. Pat. No. 5,425,085, issued to Weinberger et al., teaches a device that interconnects with the telephone line coming from a first phone and routes telephone calls along a least cost route originating from the first telephone to a second telephone via the network. A database stores billing rate parameters for determining various communications paths of different carriers based on parameters such as the time and date of the call.

U.S. Pat. No. 5,473,630, issued to Penzias et al., teaches a method of accessing long distance rate information available in a database provided by inter-change carriers. PBXs and telephone central offices access that rate information using ISDN and/or SS7 signaling and use it as a basis for determining which carrier to use at any given time in the routing of a call.

In prior art call management systems, updating the tariff database is very complicated since the interface to do so is cumbersome. Therefore, the operators of the call management system rarely update their tariff databases. As a result, the routing decision taken may not necessarily be the optimum route for the call, at that time.

SUMMARY OF THE INVENTION

Accordingly, it is an object of the present invention to provide a call management system for performing call optimization on a per call basis, providing subscribers with reduced telephone utility charges.

It is another object of the present invention to provide a call management system for performing cost optimization on a per call basis that is transparent to the subscriber and does not require the subscriber to have special know how or skills.

Yet another object of the present invention is to provide a call management system that monitors the quality and performance of the connections made by telecommunications carriers.

Another object of the present invention is to provide a call management system that calculates the least cost route for a particular telephone call.

It is another object of the present invention to provide a call management system that maintains call accounting on each call made through the system.

Yet another object of the present invention is to provide a tariff data server for monitoring and updating changes in telephone service provider tariffs and to provide a system for updating the routing information used by the least cost routers when selecting the optimum route for a call.

Another object of the present invention is to provide a tariff data server that will be linked to a public access network, such as the Internet or a bulletin board system (BBS), in order to make tariff data available to subscribers.

Yet another object of the present invention is to provide a call management system for intercepting digits dialed from a subscriber's telephone set and calculating the optimum route for the call.

There is therefore provided, in accordance with a preferred embodiment of the present invention, a method of determining an optimum carrier from a group of carriers for a telephone call dialed by a user, including the steps of intercepting a string of dialing digits, representing the telephone call, dialed by the user, determining the optimum carrier for the telephone call utilizing the dialing digits and placing the telephone call using the optimum carrier.

In addition, the step of determining an optimum carrier includes the step of choosing a carrier based on the least cost route for the telephone call. The step of determining an optimum carrier the step of choosing a carrier within the group of carriers based on performance and quality of connections made by the carrier. The step of determining an optimum carrier includes the step of choosing a carrier within the group of carriers based on the user's past calling history.

Also included, is the step of appending an appropriate access and/or authorization code to the dialing string. In addition, the method includes the step of updating appropriate internal tables to take into account the telephone call dialed by the user.

There is also provided, in accordance with a preferred embodiment of the present invention, a call management system including at least one telephone dialing unit, at least one least cost router and a database updating unit. Each telephone dialing unit dials a telephone number to place a telephone call. Each least cost router has a corresponding routing database of tariffs of telephone service providers and determines, from information in its corresponding routing database, which telephone service provider or providers to utilize to execute the telephone call. The database updating unit electronically updates tariff information into each of the routing databases shortly after updated tariff information is entered therein.

Moreover, in accordance with a preferred embodiment of the present invention, the database updating unit includes apparatus for directly connecting to the at least one least cost router. Alternatively, the database updating unit includes apparatus for providing the updated tariff information to a user who subsequently provides the updated tariff information to the least cost router.

Additionally, in accordance with a preferred embodiment of the present invention, the telephone service providers can be any of central switching offices, inter-exchange carriers, intra-exchange carriers, fax-store-and-forward providers, call-back providers and private organizational networks.

Further, in accordance with a preferred embodiment of the present invention, the least cost router includes apparatus for generating call history information including date, time, length of a phone call, destination phone number, and service provider utilized. The least cost router utilizes the call history information to determine whether or not a volume discount rate applies to the requested phone call or whether a volume commitment is to be met. It can also utilize the call history information to determine statistics of phone calls and, from the statistics, to generate expected call duration estimates.

Still further, in accordance with a preferred embodiment of the present invention, the telephone dialing unit is formed as part of any one of the following: a Centrex (CTX), a private branch exchange (PBX), CO analog line, ISDN telephone, a cellular telephone and a personal computer.

There is also provided, in accordance with a preferred embodiment of the present invention, a personal computer based telephone dialing system. The system includes a user interface unit, a dialing unit, and a least cost router. The user interface unit indicates a telephone number to be called which the dialing unit dials. The least cost router operates as described hereinabove. Preferably, the least cost router is updated by a database updating unit as described hereinabove.

There is further provided, in accordance with a preferred embodiment of the present invention, a least cost routing updating unit for updating a plurality of remote tariff databases storing therein tariffs of telephone service providers. The updating unit includes database apparatus for storing tariff information, apparatus for receiving changes to the tariff information thereby to create updated tariff information and apparatus for electronically updating tariff information into the plurality of remote tariff databases shortly after the updated tariff information is entered therein.

Additionally, in accordance with the preferred embodiment of the present invention, the apparatus for electronically updating includes apparatus for emulating the interface of a remote tariff database thereby to update the remote tariff database. This can include apparatus for directly connecting to the remote tariff databases and/or apparatus for providing the updated tariff information to a user who provides the updated tariff information to his remote tariff database.

There is thus provided in accordance with a preferred embodiment of the present invention a call management system for determining an optimum route for a telephone call made by a subscriber, the telephone call routed through one of N local exchange carriers coupled to the system via K telephone lines, each the local exchange carrier coupled to one of M long distance carriers, the system which includes a tariff data server for managing a database containing tariff related information on local and long distance carriers, local exchange, telephone exchange location related data and subscribers, a first communication link coupling the tariff data server to a local client computer, the local client computer for maintaining a client database containing tariff information relevant to the subscribers location, optional calling plans subscribed to or optional calling plans accessible from the subscribers location, the local client computer for determining the optimum route, at least one line unit coupled to a telephone set, the N local exchange carriers and the local client computer or at least a personal information manager (PIM) SW having dialing capability, the at least one line unit for intercepting digits dialed by the subscriber, monitoring one of the K telephone lines, receiving a dialing string from the local client computer corresponding to the optimum route and transmitting the dialing string onto the one of the K telephone lines, and a second communication link coupling the local client computer to the at least one line unit.

In addition, there the tariff data server includes a processor for controlling the operation of the tariff data server, a server database interface coupled to the processor, the server database interface for fulfilling database requests issued by the processor, a server database coupled to the server database interface, the server database containing tariff related information on local and long distance carriers, and a client communications module coupled to the processor and to the first communication link, the client communications module for managing communications between the processor and the local client computer.

Moreover, the tariff data system includes a report generation system coupled to the processor, the report generation system for producing reports from data collected by the system both automatically and manually, and a subscriber interface coupled to the processor, the subscriber interface for managing the collection and maintenance of subscriber supplied data.

Also, the server database includes an optional calling plan database coupled to the server database interface, a distance/local exchange database coupled to the server database interface, a carrier access database coupled to the server database interface, a subscriber database coupled to the server database interface, and a client database coupled to the server database interface.

In addition, the first communication link may include a telephone line or the Internet.

Moreover, the local client computer includes a processor for managing the operation of the local client computer, a client database update module coupled to the processor, the client database update module receiving and processing database downloads from the tariff data server, a line unit interface coupled to the processor, the line unit interface for coupling the processor to the at least one line unit, a least cost router coupled to the processor, the least cost router for determining the optimum route for a call placed by the subscriber, the least cost router returning a carrier dialing string to route the call accordingly, a user interface coupled to the processor, the user interface for providing an interface between the processor and the subscriber, a client database holding tariff data relevant to the subscriber's location and calling preferences, a client database interface coupled to the processor, the client database interface providing an interface between the processor and the client database, a call accounting module coupled to the processor, the call accounting system logging calls placed by the subscriber and determining subscriber call characteristics, and a carrier quality and performance monitoring module coupled to the processor, the carrier quality and performance monitoring module for managing the selection of the long distance carriers based on quality and performance of their connections.

In addition, the system further includes a reporting module coupled to the processor, the second communication link may include an RS-232 link coupling the local client computer to the at least one line unit; a wireless radio frequency link coupling the local client computer to the at least one line unit; or a wireless infrared link coupling the local client computer to the at least one line unit.

In addition, the at least one line unit includes a processor for controlling the operation of the line unit, a dialing receiver coupled to the processor, the dialing receiver intercepting digits dialed by the subscriber and transferring the digits to the processor, a dialer coupled to the processor, the dialer receiving a dialing string from the processor and causing the dialing string to be dialed onto one of the K telephone lines, a local client computer interface coupled to the processor, the local client computer interface providing the interface between the processor and the local client computer, a pass through coupled to the processor, the pass through having a first and second state, both the first and the second states controlled by the processor, the first state blocking the telephone set from the one of the K telephone lines, the second state coupling the telephone set to the one of the K telephone lines, a line monitor coupled to the processor, the line monitor detecting and interpreting signals occurring on the one of the K telephone lines, and a local exchange selector coupled to the pulse/tone dialer, the processor and the N local exchange carriers via the K telephone lines, the local exchange carrier coupling the pulse/tone dialer to one of the N local exchange carriers in accordance with a control signal produced by the processor.

Moreover, the dialing receiver detects and decodes pulse and dual tone multiple frequency tones or detects and decodes Integrated Digital Network Services (ISDN) signaling information.

There is also provided in accordance with a preferred embodiment of the present invention a call management system for determining an optimum route for telephone calls made by users of a private branch exchange (PBX), each of the telephone calls routed through one of N local exchange carriers coupled to the system via K trunk lines, each the local exchange carrier coupled to one of M long distance carriers, the system which includes a tariff data server for managing a database containing tariff related information on local and long distance carriers, a first communication link coupling the tariff data server to a local client computer, the local client computer for maintaining a client database containing tariff information relevant to the subscribers location, optional calling plans subscribed to or optional calling plans accessible from the subscribers location, the local client computer for determining the optimum route, at least one line unit coupled between a user's telephone set and one of the K trunk lines, the at least one line unit coupled to the local client computer, the at least one line unit for intercepting digits outpulsed by the PBX, monitoring the one of the K trunk lines and receiving a dialing string from the local client computer corresponding to the optimum route and transmitting the dialing string to the one of the K trunk lines, and a second communication link coupling the local client computer to the at least one line unit.

BRIEF DESCRIPTION OF THE DRAWINGS

The invention is herein described, by way of example only, with reference to the accompanying drawings, wherein.

DETAILED DESCRIPTION OF THE INVENTION

Figure 1:
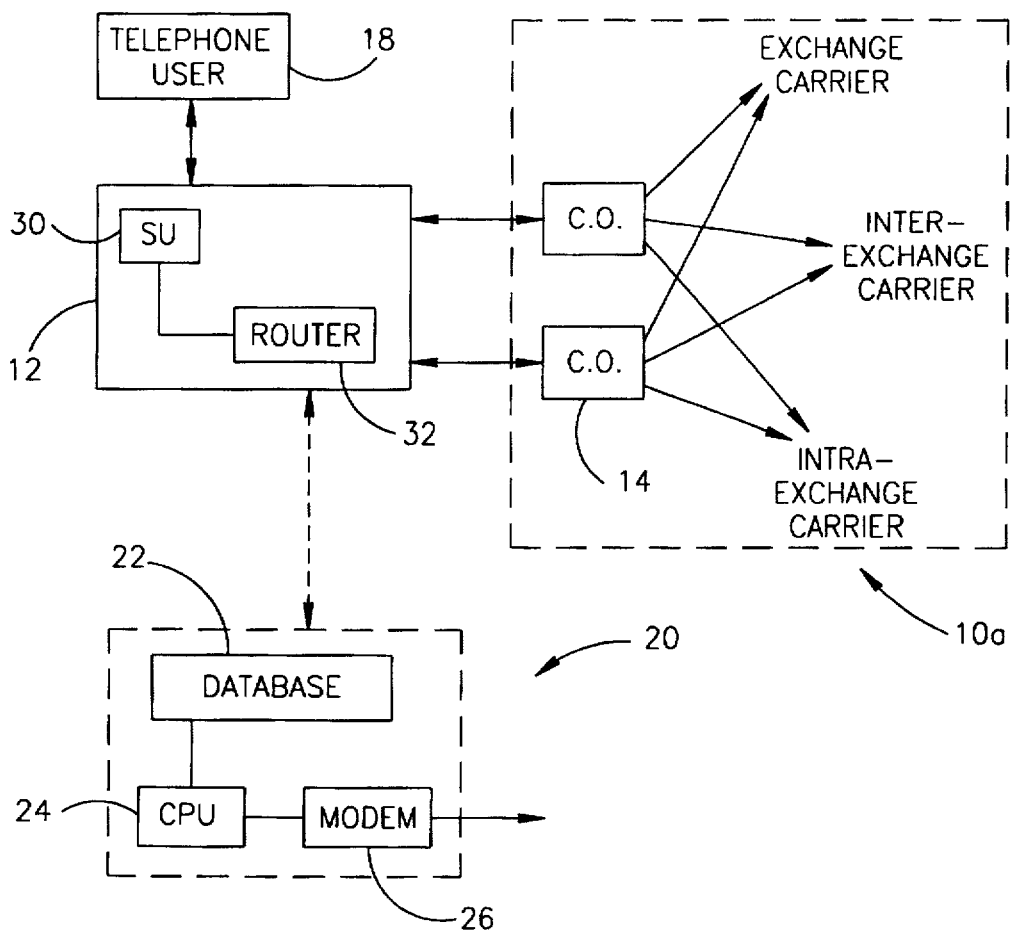
FIG. 1 is block diagram illustrating the call management system constructed and operative in accordance with a preferred embodiment of the present invention.

Reference is made to FIG. 1, which is a block diagram illustrating the call management system constructed and operative in accordance with a preferred embodiment of the present invention. FIG. 1 illustrates a simplified version of a telephone communication system, generally designated 10, comprising a single telephone dialing unit 12 in communication with a central switching office (CO) 14 of one of a plurality of telephone service providers. Telephone dialing unit 12 can also communicate with other central switching offices 14 as desired.

The call management system comprises a data server, generally designated 20, which comprises a database 22. The information in database 22 is updated by a data server operator whenever a change is made in any of the published rates of a telephone service provider, such as a local exchange carrier (LEC) or long distance carrier. The updated information is converted into a suitable format for onward transmission and communicated, by data server 20, to telephone dialing unit 12.

The information stored in database 22 includes, inter alia, all available tariff data from the multiplicity of service providers, both inter and intra-exchange carriers and others, serving the telephone communication system 10. IntraLATA carriers or LECs are carriers operating within a single Local Area Transport Area (LATA). If the dialing system operates with more than one central switching office, the tariffs for the different central switching offices are also stored. The information may be stored in any convenient format, known in the art, such as a look-up table or a database.

Data server 20 further comprises a central processing unit (CPU) 24 and a modem 26 or other similar apparatus for communicating via telephone lines or via any other data communication network. Central processing unit 24, which may be any commercially available processor, controls the operation of data server 20. Modem 26 is used to transfer updated data directly to dialing unit 12. Alternatively, modem 26 can transfer updated data to a third party, such as an electronic mail (e-mail) address from where it may be collected by dialing unit 12 or by an operator.

Telephone dialing unit 12 comprises a dialing unit, such as a tone or pulse telephone dialer, a modem or an ISDN dialing unit, and also comprises a storage unit 30 and a router (or route selector) 32. Storage unit 30 is any storage medium, known in the art, which can be used, inter alia, for storing the provider and tariff information received from data server 20. Storage unit 30 may also be used to store any other relevant data, such as special negotiated discounts, promotions and call accounting data, which may be needed by the router to calculate the optimum least cost route (LCR) for telephone calls. Router 32 can be any routing unit, known in the art, which recognizes the dialing information input by the call originator and, in accordance with pre-defined parameters, calculates the LCR and consequently reroutes the call. Router 32 can also include routing features as described hereinbelow.

Whenever telephone user (or subscriber) 18 originates a call, router 32 intercepts the digits of the dialed number and processes the calling information. Note that the telephone call may not only be generated by a human but also by a machine. Thus, the 'user' may be a human or a machine. Router 32 then accesses storage unit 30, calculates the least cost routing (LCR) data to ascertain the optimum route for the call, adds any necessary access and authorization codes, and then passes the resulting route selection data to dialing unit 12. Dialing unit 12 then initiates the call to CO 14 which routes the call in accordance with the route selection data signals sent by dialing unit 12. If there is more than one CO, dialing unit 12 also physically switches the connection to the selected CO 14.

In order for telephone user 18 to obtain the maximum benefit from the plurality of constantly changing tariff rates, it is necessary to maintain an accurate and updated database in storage unit 30. Whenever a change in any of the tariffs is made by any of the providers or central switching offices, the information stored in database 22 is updated by the data server operator. An updated file is then sent by modem 26 to storage unit 30, either directly or preferably via e-mail or the Internet. Alternatively, a diskette containing the updated information can be loaded directly by the telephone user 18 into the storage unit 30, as is known in the art.

Figure 2:
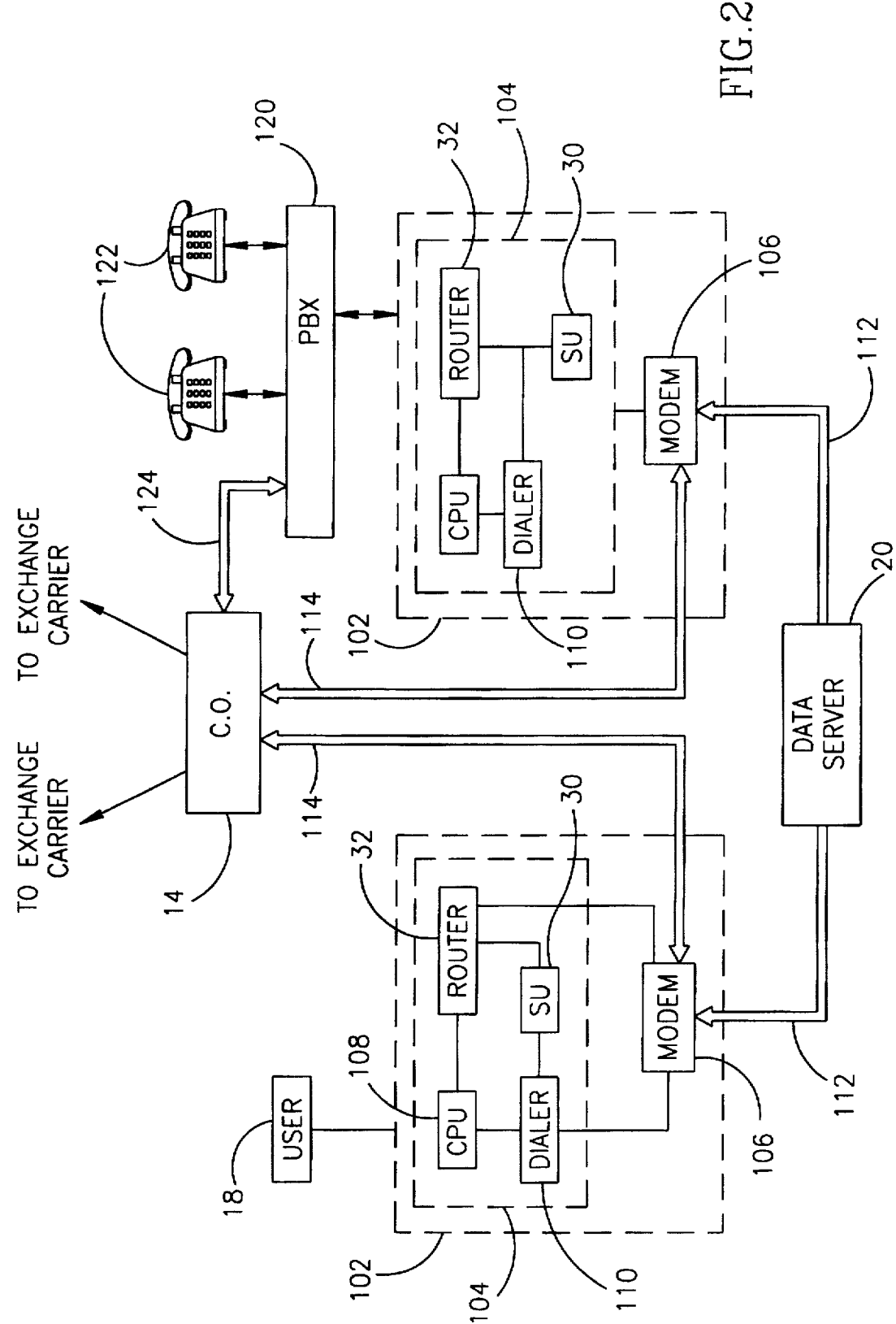
FIG. 2 is a block diagram illustrating the relation of the data server to a plurality of telephone dialing units of the preferred embodiment of the present invention.

Reference is now made to FIG. 2 which is a block diagram illustrating the relation of data server 20 to a plurality of telephone dialing units 102. For simplicity, each telephone dialing unit 122 is shown communicating with only one CO 14. Embodiments having similar elements have similar reference numerals throughout.

In a first embodiment, telephone dialing unit 102 comprises a computer, such as a personal computer (PC) 104 connected to a modem 106. PC 104 and modem 106 are of types commercially available. PC 104 comprises a central processing unit (CPU) 108 which controls the operation of the PC 104 and optionally a built-in dialer 110. Modem 106 is used to receive data from data server 20 (double line 112) and to connect dialing unit 102 to CO 14 (double line 114). Modem 106 maybe a dial-up modem which can alternatively be used to directly dial CO 14, without the need for a separate dialer. PC 104 further comprises the storage unit 30 and router 32, described hereinabove. Built-in dialer 110 is, for example, any commercially available computer based communications program incorporating dialing facilities.

To make a call, user 18 utilizes a user interface, such as a keyboard, a mouse, etc., to initiate the call and dial the number. Router 32 intercepts the digits of the dialed number, processes the calling information and accesses storage unit 30, processes the LCR data and selects the optimum route for the call. The call is then dialed by modem 106 in accordance with the optimum routing information ascertained and correspondingly rerouted via CO 14.

In a second embodiment, telephone dialing unit 102, which is similar to the first embodiment, described hereinabove, is also connected to a telephone communications system serving a plurality of stations, such as a Centrex (or CTX) or private branch exchange (PBX) 120, having a plurality of telephones 122 connected thereto. The PBX 120 does not have any least cost routing capabilities.

In this embodiment, the caller may initiate the call by using the built-in dialer 110 to dial the number, as described hereinabove with respect to the first embodiment. In this case, the call is dialed out via the PBX 120 (double line 124). Persons who are not connected to a PC having the relevant LCR data may dial out via the PBX 120 (double line 124).

In a further embodiment, PBX 120 is connected directly to PC 104. The PBX 120 can be configured to intercept dialing by telephones 122 and access the storage unit 30 and router 32 of PC 104 to extract the optimum LCR information and reroute the calls.

Whenever the PBX 120, which is connected to PC 104, receives a call, the PBX 120 accesses the storage unit 30 containing the LCR data. Router 32 processes the call data and selects the optimum route for the call and then PBX 120 dials this optimum route.

It will be appreciated that the router 32 can be implemented as part of the telephone dialing unit 102, as part of the PBX 120 or between the PBX 120 and the central switching office 14. No matter where the router 32 is implemented, it provides routing for the call initiated by the telephone 122. If the PBX 120 has routing abilities, and the router 32 operates after the PBX 120, the router 32 can change the routing decisions of the PBX 120. This is especially useful if the router of the PBX 120 has a difficult interface and therefore, is not updated often. The user will still receive the least cost route since the router 32 is updated frequently by data server 20.

Data server 20 can communicate with any or all of the systems described hereinabove. Whenever it has update tariff information, it sends the updated information to all of the systems with which it communicates. The data server 20 can also update the tariff information within a prior art router by emulating the operator which has to enter the tariff information.

It will be appreciated that the router 32 can also be operated in conjunction with a cellular or wireless telephone. As in the previous embodiments, router 32 can be embedded in such cellular or wireless telephones or it can be formed as a separate unit.

Finally, it is noted that, in accordance with the present invention, the telephone service providers with which the router 32 operates can be any type of service provider, including but not limited to: inter-exchange carriers, intra-exchange carriers, fax-store-and-forward providers, call-back service providers, local central switching offices and private networks. For fax-store-and-forward providers and call-back service providers, the router 32 or some other portion of the dialing system manages the protocol by which such providers operate.

Figure 3:
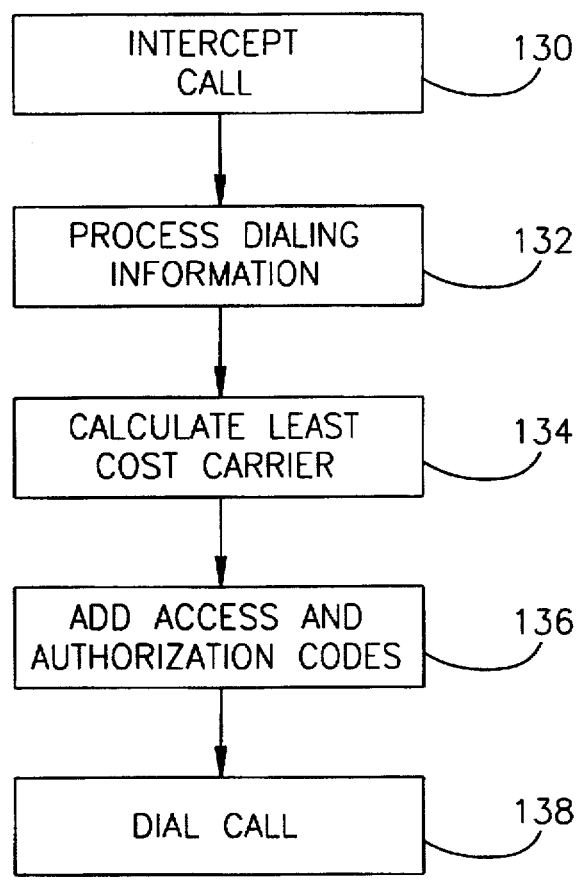
FIG. 3 is a flow chart illustrating a method of real time call routing using the call management system of the present invention.
Figure 4:
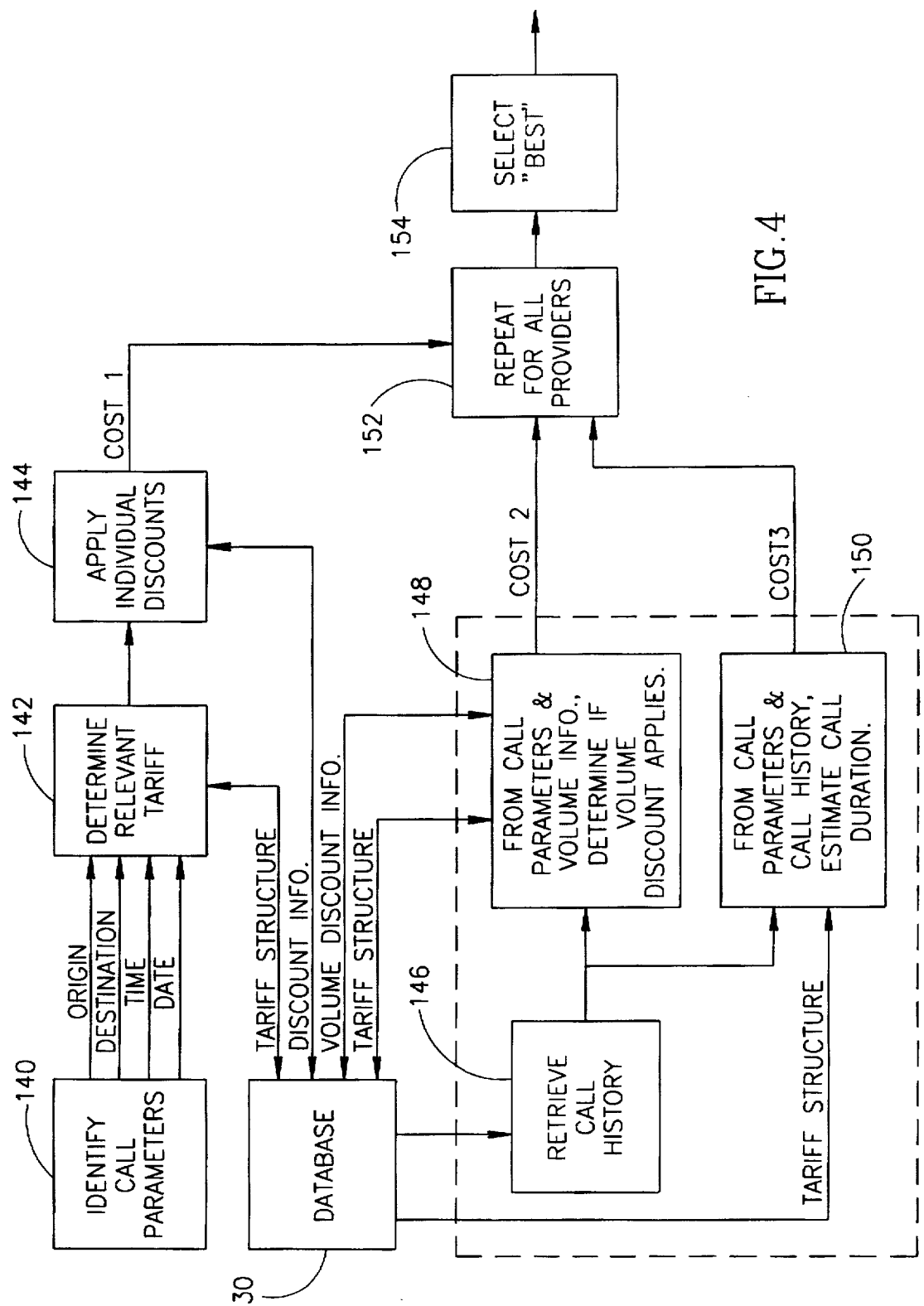
FIG. 4 is a detailed flow chart illustrating the step of processing the dialing information.

Reference is now made to FIGS. 3 and 4. FIG. 3 is a flow chart illustrating a method of real time optimum routing of a telephone call, using the call management system of the present invention. FIG. 4 is a detailed flow chart illustrating the step of processing the dialing information.

When a call is initiated, router 32 intercepts the call (step 130) and processes the dialing information (step 132). The router then processes the dialing information, as described hereinbelow, and calculates, from all the relevant calling and provider charging and subscriber data, which provider is preferred in order to obtain the least cost route (step 134). Having selected the provider, any necessary access and authorization codes are added to the dialing parameters (step 136) and the call re-dialed using the adjusted parameters (step 138).

The step of processing the dialing information is detailed in FIG. 4. The call parameters, such as date and time of the call together with the originating and destination numbers, are identified (step 140). Storage unit 30 containing the LCR data is accessed and scanned to retrieve charging data for the particular calling parameters identified. The basic cost of the desired call is then determined (step 142).

Storage unit 30 is also scanned to ascertain whether the call initiator is entitled to any special negotiated discounts from one or more providers, and if relevant, the data is retrieved and the relevant discount is applied (step 144). The result is a first value for the cost of the call, per minute.

Optionally, a check can be made to determine whether call accounting data, as is known in the art, is available and if so the relevant data is retrieved (step 146). This data provides a history of the calls made with a particular service provider and is utilized, for example, to determine (step 148) whether or not a volume discount currently applies or whether it is useful to utilize a certain service provider in order to achieve the volume discount. A volume discount cost is produced.

From the call history, statistics of previous call durations can be made. For example, the statistics can be of the call duration per destination phone number, per distance away from the originating phone number or any other statistic. From these statistics, it can be determined if the call is expected to be short or long, in which case, the tariff of one service provider may be better than that of another for the expected length of the call. In addition, a call distribution profile is maintained based on past calling history. The call distribution data and its effect on call pricing are used in estimating the cost of the call. For example, an average call of 1.5 minutes would be cheaper using a more expensive carrier that bills using 6 sec/6 sec billing rather than a less expensive carrier that bills using 60 sec/60 sec billing. A user making many short duration calls, for example 10–15 seconds, would prefer 6 sec/6 sec billing over 60 sec/60 sec billing. An expected cost of the call is produced (step 150).

The above steps are repeated (step 152) for all service providers and the optimum service provider (i.e.,, the one which provides the lowest cost) is selected (step 154). In addition, the information regarding the call (origin, destination, selected provider, and length of call) are stored in the database for later call history use.

Figure 5:
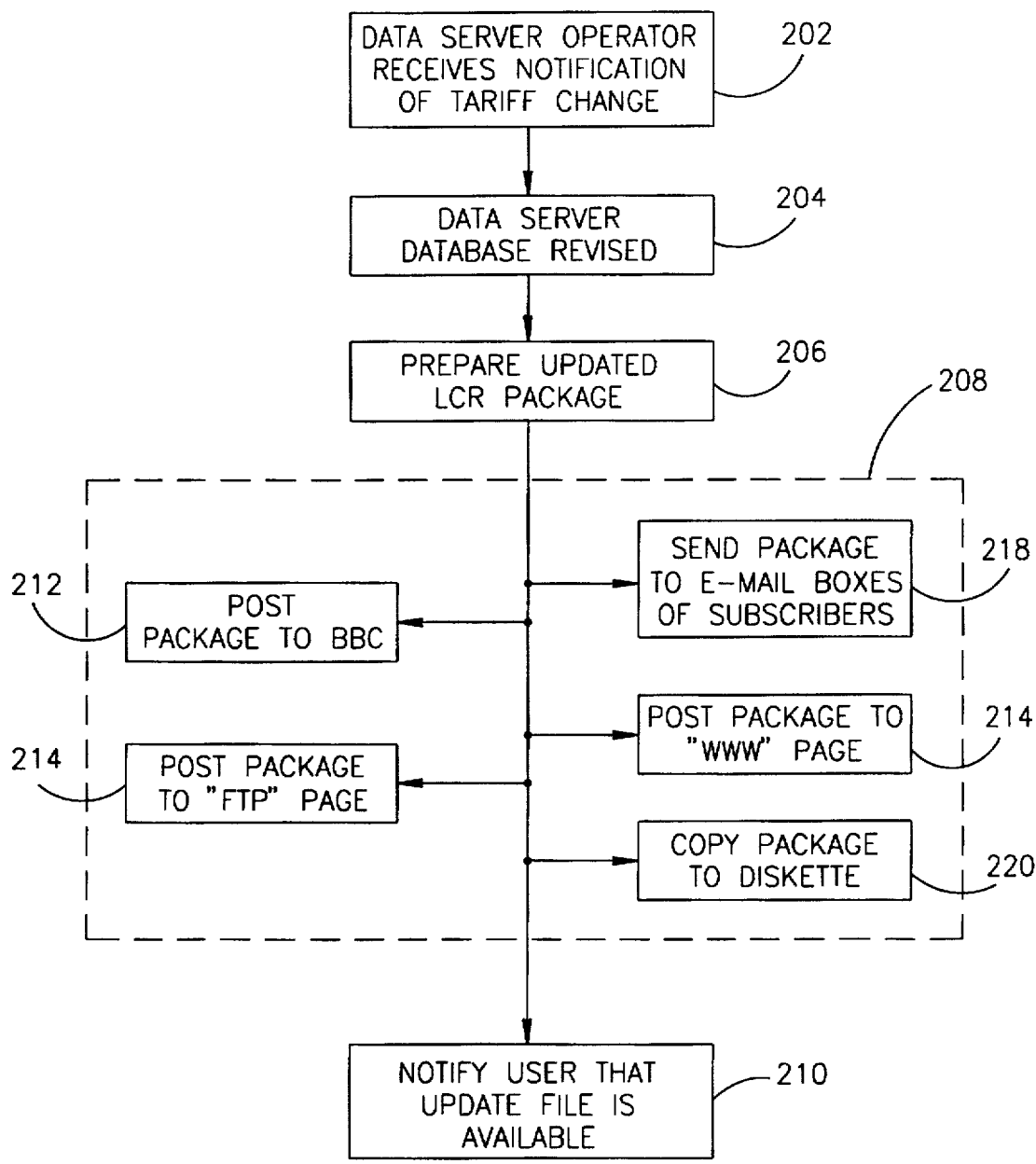
FIG. 5 is a flow chart illustrating the process of updating the storage unit.

Reference is now made to FIG. 5 which is a flow chart diagram illustrating the process of updating storage unit 30 belonging to telephone user 18.

Whenever data server 20 receives notification of a change from one of the telephone service providers or a regulatory body (step 202), database 22 is revised (step 204). A package containing the updated LCR information is prepared (step 206), for example in the form of a data file. Data server 20 then posts the updated LCR package to an accessible medium (step 208), shown by dashed lines, and notifies telephone user 18, by any suitable means, that an updated file is available for downloading or collection (step 210).

The accessible medium to which the LCR package may be posted include, for example, any suitable forum accessible by modem. For example, the files can be made available by data server 20 to subscribers 18 through a bulletin board (step 212), via file transfer using a file transfer protocol (FTP) (step 214) or world wide web (WWW) (step 216), or similar, such as are available today through the Internet. The updated package can also be downloaded by data server 20 to the user's e-mail address (218) or copied to a diskette and mailed to the user (220).

To update the routing data stored in storage unit 20, user 18 can retrieve (or upload) the updated file, via his modem 106, from one of the sites (described hereinabove) to which it has been downloaded by data server 20. The updated data is then stored in storage unit 30.

Figure 6:
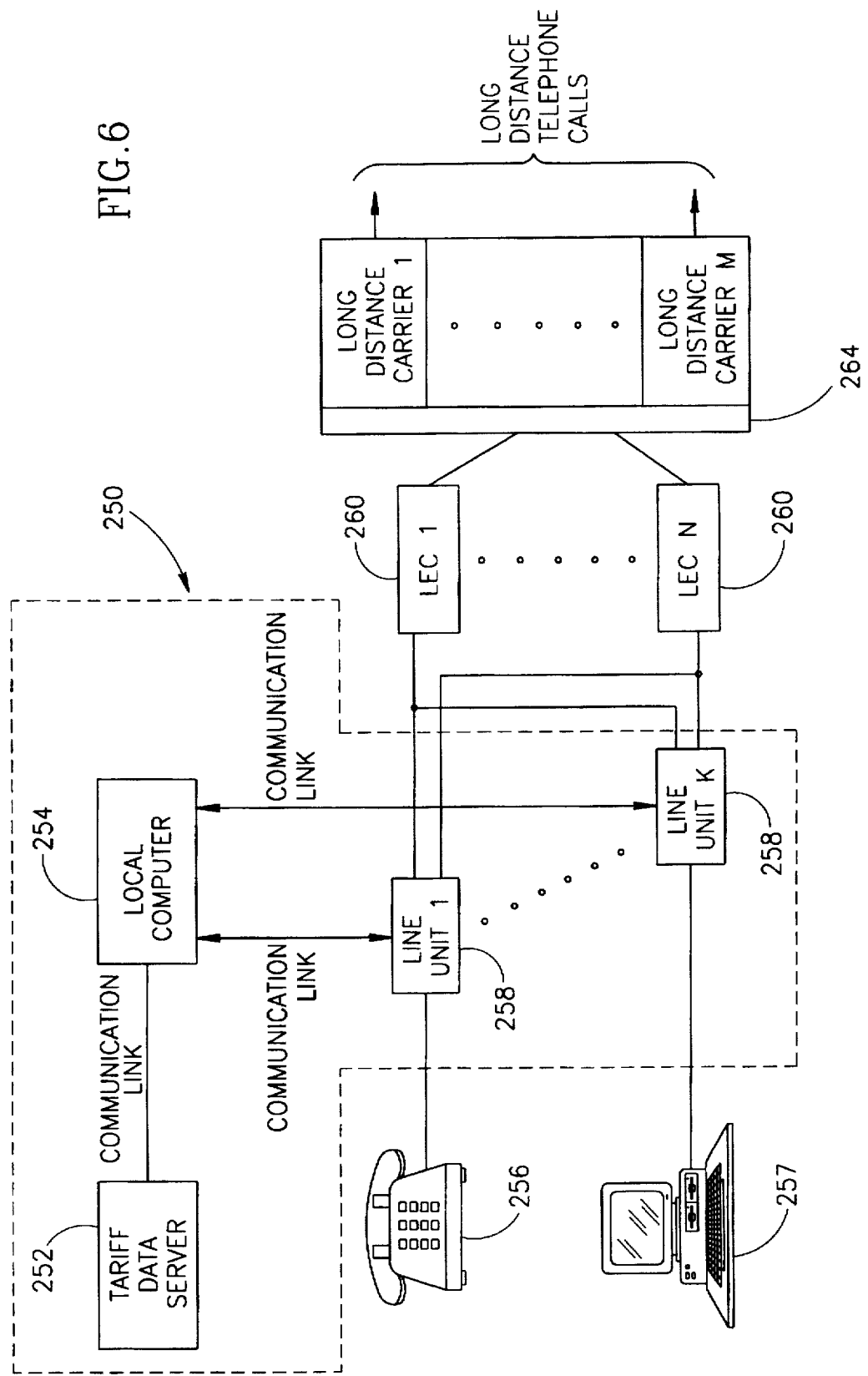
FIG. 6 is a high level block diagram illustrating an example of a call management system built in accordance with a preferred embodiment of the present invention and utilizing a generic communications link.

In a preferred embodiment, the tariff rate database, the least cost routing process and the telephone line interface circuitry are implemented as a distributed system of interconnected components. A high level block diagram of an example of a call management system constructed in accordance with a preferred embodiment of the present invention is illustrated in FIG. 6. The call management system, generally referred to by reference numeral 250, comprises a tariff data server 252, a local client computer 254 and one or more line units 258. System 250 interfaces to analog lines and/or trunks such as those commonly used with residential or small or medium office PBX telephone systems. Tariff data server 252 holds tariff and subscriber related data. The tariff information includes data on different carriers including both local and long distance telephone companies. The tariff data covers different tariff schemes available from each telephone company at each locality. The tariff data is downloaded to local client computer 254 either periodically or according to another schedule such as upon a modification to a tariff schedule. Tariff data server 252 is coupled to local client computer 254 by a communications link. The communications link may include any suitable type of link such as a pair of modems over an ordinary telephone line, leased or private line, etc.

Any number of line units 258, labeled 1 through N in FIG. 6, are installed between a telephone set 256 and the public telephone network. In addition to telephone set 256, line units 258 may be coupled to one or more personal computers 257 with telephone dialing capabilities (i.e., attached fax/modem cards). The public telephone network is represented by Local Exchange Carriers (LECs) 260, 262. Each LEC, in turn, is coupled to one or more long distance carriers 264 labeled 1 through M. Long distance telephone calls made by a subscriber are placed by one of N long distance carriers 264. Line unit 258 communicates with local client computer via a communications link. The communications link may be wired or wireless (i.e., RF, infrared, etc.) and is a bi-directional communications channel. When a call is placed, one of the line units 258 intercepts digits dialed by the subscriber through coupled telephone set 256 and routes them to local client computer 254. Local client computer 254 computes the least cost route using various parameters and translates the dialed number into a series of digits that will route the call to the least cost carrier. The translated dialing string is sent to the line unit 258 which actually dials the number. In a preferred embodiment, each line unit 258 is able to connect to any number of N LECs. When more than one LEC is available, local client computer 254 calculates the least cost LEC, in addition to the least cost long distance carrier, and instructs line unit 258 to steer the call to that LEC.

Local client computer 254 controls the determination of the telephone dialing string corresponding to the optimum LEC and long distance carrier. Local client computer 254, a personal computer (PC) or other suitable computing means, accumulates the outgoing call data (i.e., destination, time, duration, etc.) The collected data serves as the basis for call accounting, volume discount, call progress and call savings reports. Local client computer 254 is typically coupled to more than one line unit 258. Preferably a line unit is coupled to every telephone set in the system. This provides maximum savings by intercepting each call and determining the optimum carrier to place the call through. Each line unit is coupled to local client computer 254 via a wired or wireless communications link. Local client computer 254, in addition to line unit 258 and tariff data server 252, are described in more detail below.

Figure 7:
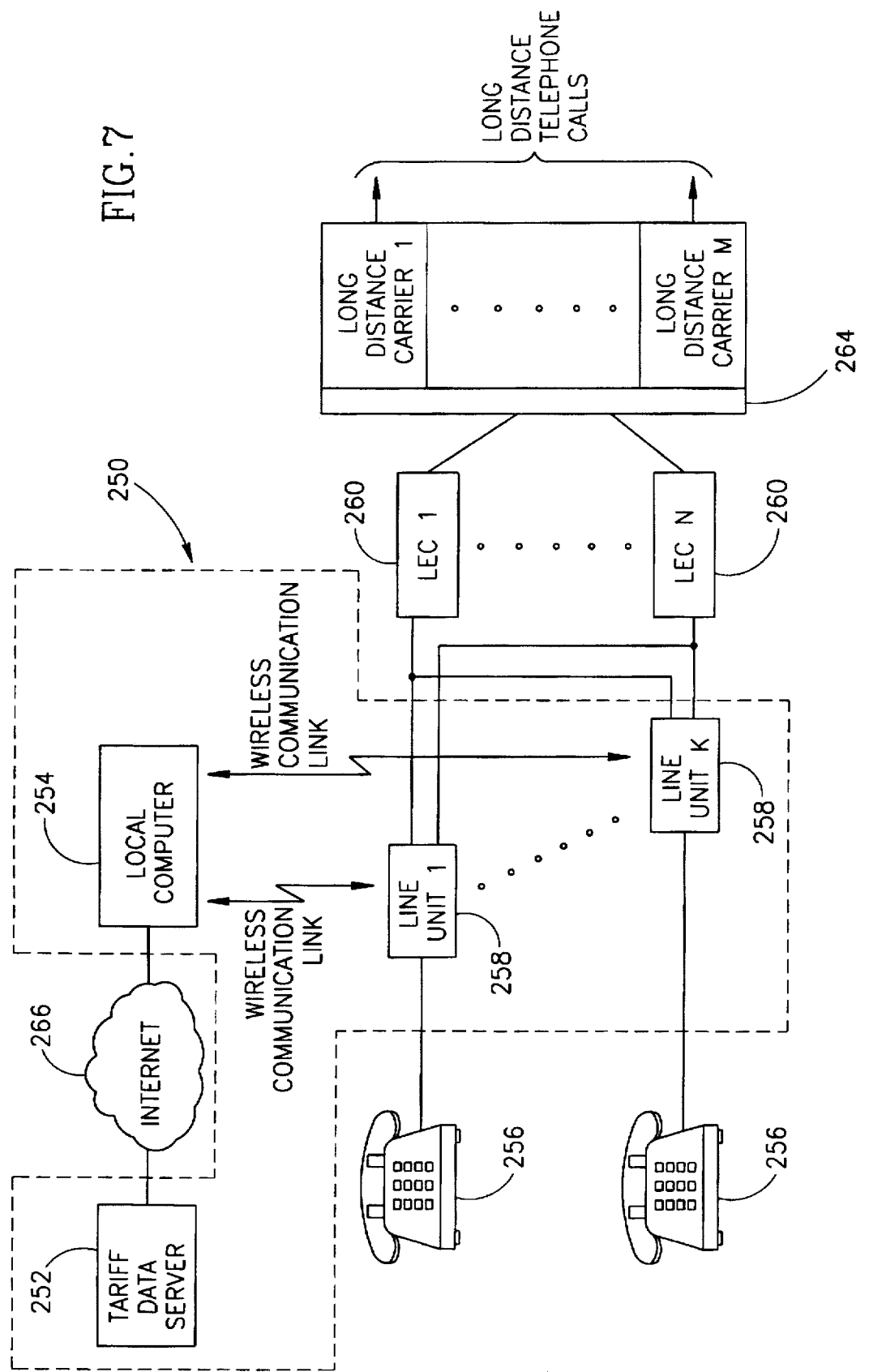
FIG. 7 is a high level block diagram illustrating an example of a call management system built in accordance with a preferred embodiment of the present invention and utilizing the Internet as the communications link.

In a preferred embodiment, shown in FIG. 7, system 250 utilizes the Internet 266 for the communication link between tariff data server 252 and local client computer 254. System 250 incorporates use of the various standard applications available on the Internet including, but not limited to, electronic mail (SMTP), file transfer protocol (FTP), gopher and the world wide web (WWW). In addition, local client computer 254 is coupled to one or more line units 258 via a wireless link (i.e., RF, infrared, etc.).

Figure 8:
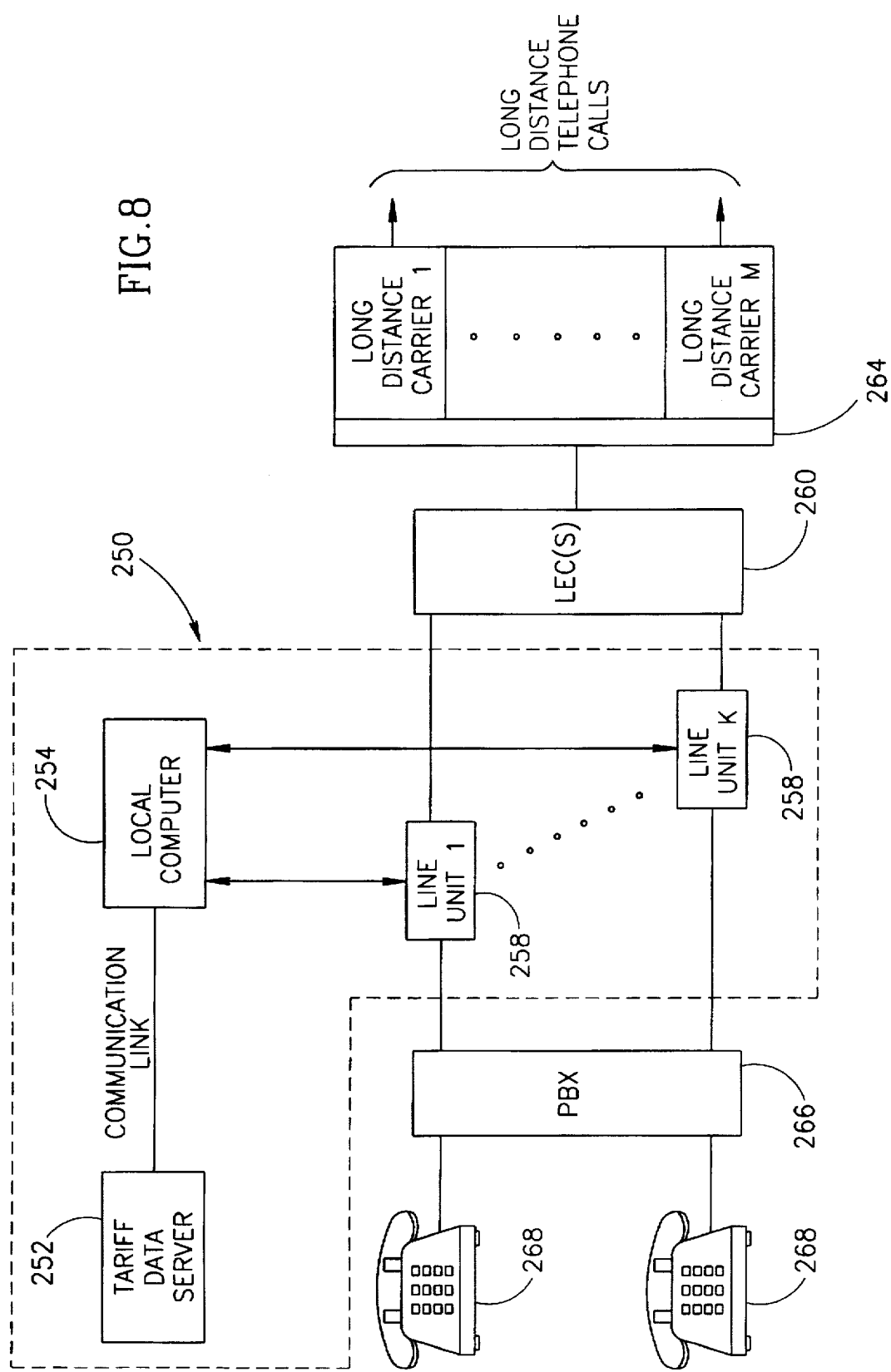
FIG. 8 is a high level block diagram illustrating an example of a call management system coupled to a PBX and built in accordance with a preferred embodiment of the present invention.

In a preferred embodiment, shown in FIG. 8, system 250 is adapted to perform call management for users of a small PBX 266. Referring to FIG. 8, tariff rate server 252 is coupled, via a communication link, to local client computer 254. A line unit 258 is associated with each trunk in the PBX system. Each line unit is coupled to local client computer 254 via either a wired or wireless communication link. Each line unit is also coupled to one or more LECs 260, which in turn place long distance calls through one or more long distance carriers 264.

Figure 9:
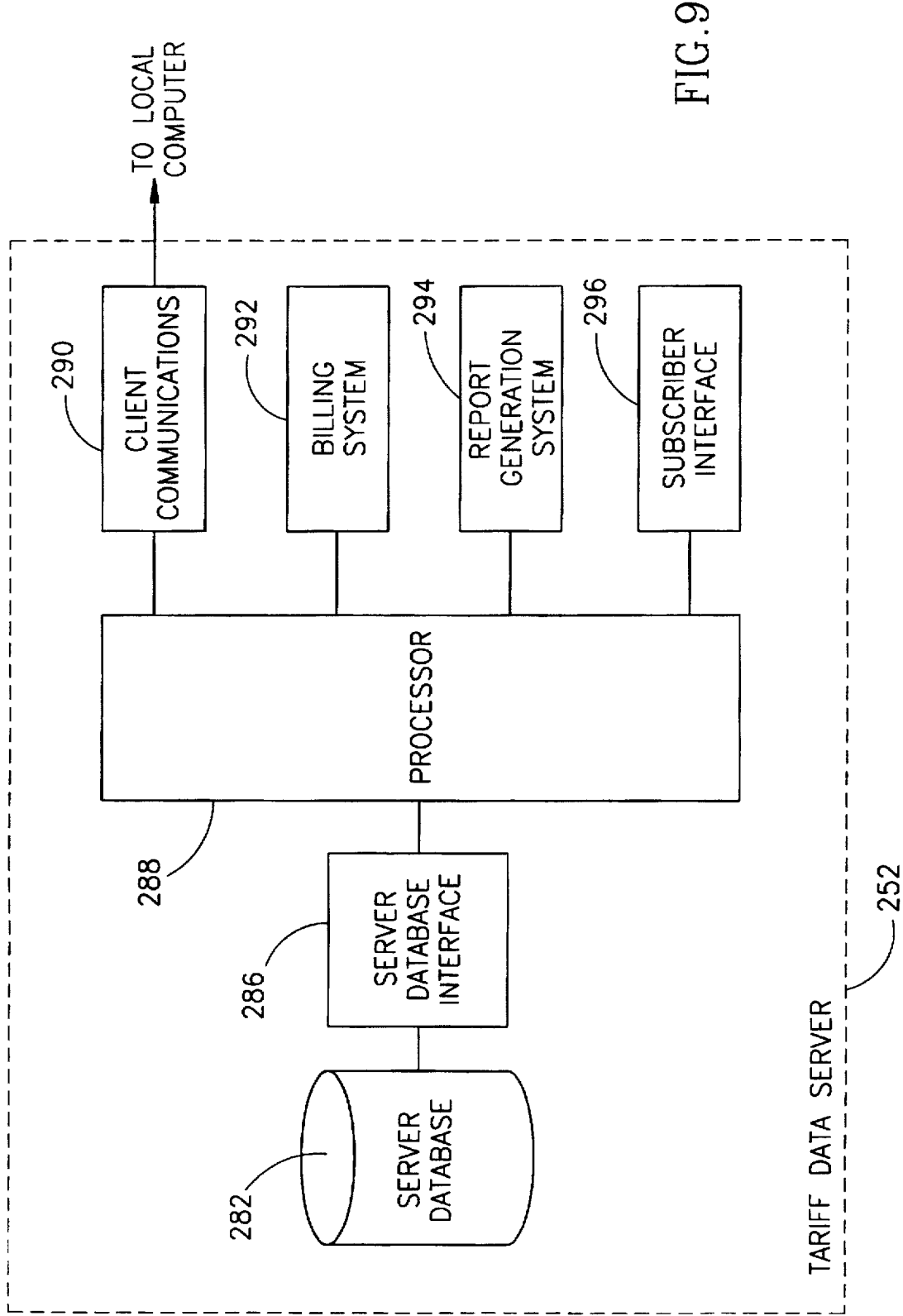
FIG. 9 is a detailed block diagram illustrating the tariff data server portion of the present invention.

The tariff data server 252 will now be described in more detail. A detailed block diagram of the tariff database server is illustrated in FIG. 9. Tariff database server 252 comprises a processor 288, a server database interface 286, a server database 282, a client communication module 290, a billing system 292, a report generation system 294 and a subscription interface module 296. As discussed previously, the function of tariff data server 252 is to provide each subscriber with current tariff schedule data to allow the least cost routing module in local client computer 254 (FIG. 6) to determine the least cost route in an accurate manner, reflecting up to date tariff information. The server updates a client database maintained on the local client computer only with tariff data relevant to the subscribers location and which is also based on subscriber provided information. Subscriber location is stored according to the numbering plan area (NPA) and the local exchange (NXX).

The tariff data server communicates with the local client computer, located in the client portion of call management system 250, via a communications link. Processor 288 controls client communications module 290, which handles all communications between the tariff data server and the local client computer. Call management system includes an update mechanism to allow a client database to reflect ongoing changes to tariff schedules and carrier's optional calling plans (OCPs). Server communications can take place via any suitable means, such as electronic mail (e-mail) or FTP. A subscriber can choose to receive updates in any one of the following ways: per tariff change or periodically. In both cases, either the entire database can be downloaded or only the relevant database transactions need be sent. In addition, the subscriber or client can initiate a database transmission. Either a complete database download or only a portion of it can be sent via e-mail to the subscriber. The local client computer then extracts from the e-mail message the relevant data and updates its client database.

Billing system 292, coupled to processor 288, functions to maintain subscriber information needed for billing purposes, if system services are sold on a monthly basis, and to track and update invoices, bills, payments, etc. for all subscribers. Report system 294 functions to generate various types of reports for system 250. Reports that pertain to subscriber information, OCP reports and carrier reports are an example of the types of reports available. Subscriber interface 296 receives and processes registration forms containing subscriber data. The data is received either via e-mail, fax, regular mail, etc. and the data processed and entered into attached server database 282.

Figure 10:
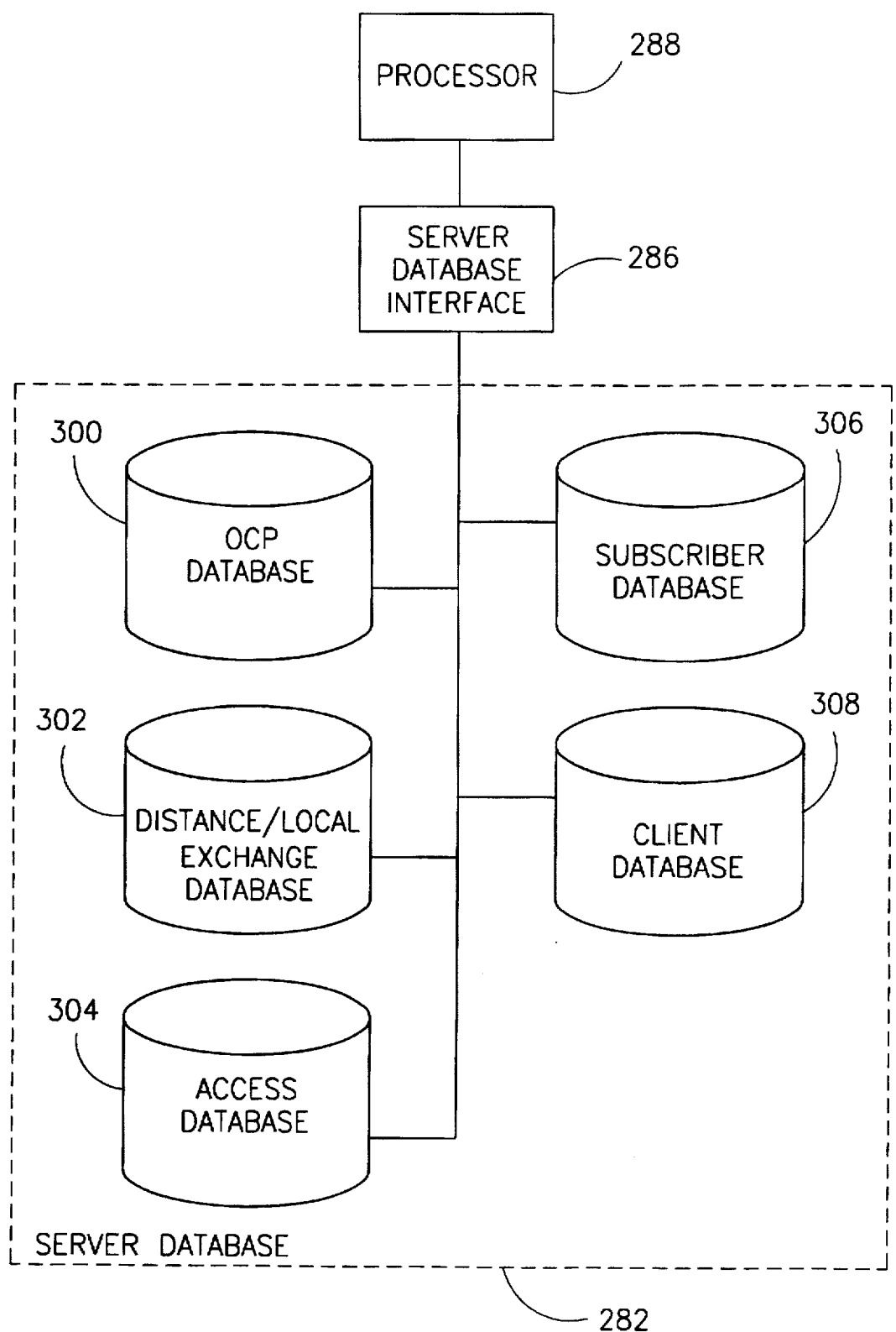
FIG. 10 is a detailed block diagram illustrating the server database portion of the tariff data server.

Server database interface 286 couples processor 288 to server database 282. Server database interface 286 handles all database requests from processor and is responsible for the maintenance of server database 282. A more detailed diagram of server database 282, showing the individual databases it comprises, is illustrated in FIG. 10. Server database 282 comprises an OCP database 300, distance/local exchange database 302, an access database 304, a subscriber database 306 and a client database 308. For all databases comprising the server database, server database interface 286 serves as the interface for database requests from processor 288.

With reference to FIG. 10, OCP database 300 contains data on local long distance toll OCPs supported by call management system 250 and covers the following jurisdictions: local intraLATA/intrastate; intraLATA/interstate; interLATA/intrastate; interstate; international (i.e.,, Canada, Mexico, Hawaii, Puerto Rico); local and overseas. In a preferred embodiment, OCP database 300 includes the following parameters: OCP name, OCP code, carrier code, jurisdiction type, OCP locality, billing method (i.e.,, mileage, NPA bands, flat rate, etc.), rate data, time of day dependence, day of year dependence, call billing parameters (i.e.,, initial period rate, overtime period rate), rate period specific (RPS) flag, volume discounts, tapering, discounted countries (i.e.,, discount percentage—MCI's 'friends and family' OCP), discounted NPAs (i.e.,, MCI's 'friends and family'), discounted telephone numbers (i.e.,, MCI's 'friends and family'), prepaid period option, period commitment discount, volume commitment, carrier identity, promotions, optional OCP to be concatenated with (i.e., combineability with volume generated via other types of calls such as other OCPs or 1-800 calls) and validity period.

Distance/local exchange database 302 contains the geographic coordinates (i.e., vertical and horizontal (V & H) data) of all NPA/NXXs. This data enables the calculation of the distances between the calling location and the called destination designated by the NPA/NXX for the purposes of determining if the call is a local or long distance call and to calculate the rate for a long distance call.

Access database 304 contains the following information on a per OCP and NPA basis: availability data, jurisdiction and access method. Availability data includes whether the OCP is available only as a primary long distance carrier, available upon registration as a secondary long distance carrier, available as a casual call (i.e., gypsy) or not available. The access method for each OCP in each NPA may include 10-XXX, 1-950-7D-User Authorization Code (UAC), 1-800-7D-UAC, 1-888-7D-UAC (7D is equivalent to 7 dialed digits).

Subscriber database 306 contains subscriber data, received from the subscriber, and includes the following: subscriber telephone numbers, subscriber's main billing account, subscriber userID, license size (i.e., the number of line units), organization, subscriber contractual OCPs, e-mail address, account number, registration data, last month paid, subscriber name, telephone number, fax number, address, primary carrier including OCP and start date, secondary carriers and related OCPs, associated start dates, subscriber long distance initial volume and monthly volume of credit card calls and 1-800 lines to be summed for volume discount calculation purposes. Means are provided to add/delete/modify subscriber registration data, OCP data and carrier data.

Client database 308 is dynamically derived for each group of subscribers with a common NPA/NXX or for a specific subscriber for their specific region and related data, in accordance with the particular arrangement with the subscriber. The client database provides the necessary data for downloading full or partial databases to subscribers or clients. The data contained in the client database is derived from the other databases and includes information relevant only for that subscriber. The client database includes: a list of all accessible OCPs, the rate step (mileage rings for rate calculation) and validity date key. Accessible OCPs are defined as the primary long distance carrier OCP to which the subscriber is registered, other OCPs to which the subscriber registered other than through their primary long distance carrier and all OCPs available at the subscriber location via a casual call (i.e., gypsy) for all other carriers. The rate step comprises three parts: a list of all NPA/NXX to a local call, detailed rate steps for exchanges requiring both NPA and NXX to determine rate step and non-designated NPAs for those NPAs for which the entire NPA is included in one rate step. The validity date key is the latest data for which the client's database is valid.

Figure 11:
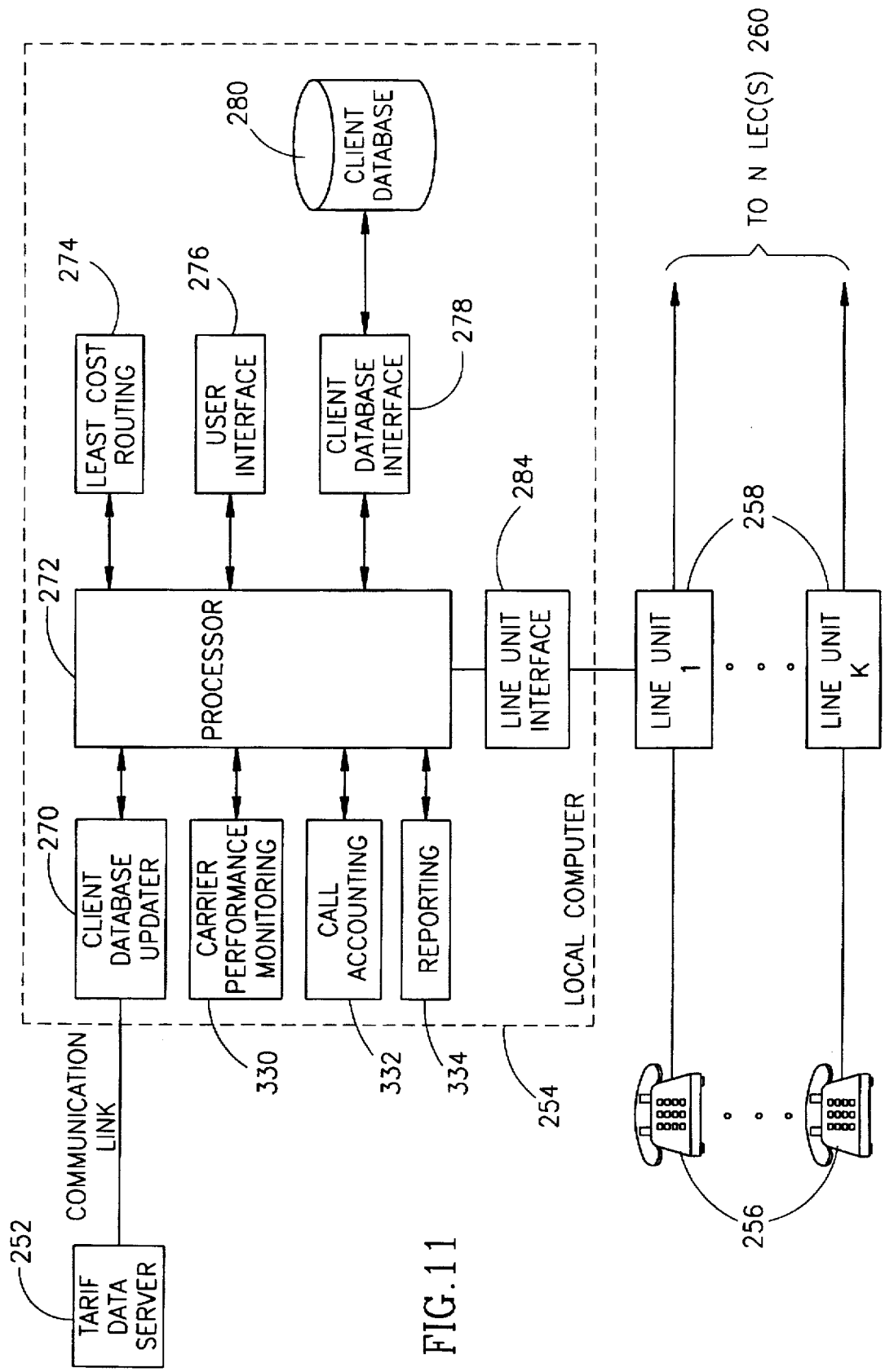
FIG. 11 is a detailed block diagram illustrating the local client computer of the present invention.

Local client computer 254 (FIG. 6) will now be described in more detail. A detailed block diagram of the local client computer is illustrated in FIG. 11. Local client computer 254 comprises a processor 272 coupled to a least cost router 274, a user interface module 276, a client database interface 278, a call accounting module 332, a reporting module 334, a carrier quality and performance monitor 330, a line unit interface 284 and a client database updater 270. The local client computer client functions to route a subscriber originated call via the optimum carrier/LEC combination. The optimum route is determined by calculating the expected call price of a call of average duration via all possible OCPs while considering parameters such as performance and quality and then choosing the carrier associated with the optimum call route.

With reference to FIG. 11, client database updater module 270 provides the interface between processor 272 and tariff data server 252. Client database updater 270 receives partial or full database downloads from tariff data server 252 via a suitable method (i.e., e-mail or FTP), decodes the message and updates a client database 280 via client database interface 278. Any commercially available Internet application software package may be used to provide e-mail and FTP functionality (i.e., Netscape manufactured by Netscape Communications Corp. or Chameleon manufactured by NetManage, Inc.). The client database comprises data derived from any or all of the following sources: data downloaded from the tariff data server, data entered by the subscriber or data collected locally.

The data downloaded from the tariff data server has been previously described. The data entered by the subscriber comprises, but is not limited to, the subscriber's name, subscriber's telephone number, main account number, primary carrier and OCP, secondary carriers and OCPs, number of trunks or telephone lines, telephone numbers 1 through N including central office (CO) lines or PBX trunks/extensions and the corresponding PBX access code (if needed) for each telephone number, number of line units installed at the site, line unit ID number for line units 1 through K, ignored prefix numbers, preferred country if OCP selected, preferred NPA if OCP selected, preferred destination if OCP selected, initial long distance call volume, 1-800 normal volume, credit card normal call volume, long distance companies prohibited from being used by subscriber, length of log file and whether on-line display is required. The data collected locally is accumulated via call accounting module 332. Call accounting module 332 functions as a set of meters and provides data necessary for least cost router 274. The meters provide monthly accumulated cost per OCP and, on a per jurisdiction basis, average call length, and a call length distribution table and call establishment duration. In addition, call accounting module 332 functions to log subscriber call data for the generation of periodic reports and to calculate subscriber call characteristics required for least cost router 274. A call distribution profile is maintained based on past calling history. The call distribution data and its effect on call pricing are used in estimating the cost of the call. For example, an average call of 1.5 minutes would be cheaper using a more expensive carrier that bills using 6 sec/6 sec billing rather than a less expensive carrier that bills using 60 sec/60 sec billing. A user making many short duration calls, for example 10–15 seconds, would prefer 6 sec/6 sec billing over 60 sec/60 sec billing.

For embodiments of the present invention coupled to a PBX, local computer 254 may receive call accounting data directly from the PBX via local interfaces, in addition to or in place of the call accounting data collected by call accounting module 332, since many modern PBXs have call accounting functionality built-in.

Other data collected locally includes data output from carrier performance monitor 330. Since using call management system 250 is likely to encourage the use of small carriers, the performance of the established call connection may vary from call to call for different carriers. The quality and performance of a carrier is measured by the percentage of established calls, the time to call establishment and the voice quality of the transmission line. Percentage of established calls means calls established upon the first attempt. Voice quality is measured by the subscriber, using the telephone set. If the subscriber is not satisfied with the voice quality of the call, a digit sequence, such as 'BAD', may be entered to flag the call as having poor quality. System 250 collects quality and performance related data associated with each call to be able to monitor a carrier's quality and performance. The following data is collected on a automatic basis with no intervention required from the subscriber. All calls which have not been established due to one of the following reasons will be recorded: lack of ring tone or a busy tone, congestion tone (i.e., fast busy) detected or the call duration was for less than a predetermined minimum. In addition, data collected on a manual basis includes all calls the subscriber flags as 'bad' (i.e., poor quality of connection due to noise, etc.). To avoid the usage of bad quality carriers, once a carrier is first flagged either automatically or by the subscriber, calls will be routed to the second least cost carrier. After a predetermined number of flaggings within a finite time, the carrier will be suspended for a period of time. After a certain number of suspensions within a week, the carrier will be suspended for a week and the user notified accordingly.

In addition to collecting and processing carrier performance data using carrier performance monitor 330, processor 272 may receive carrier performance data from tariff data server 252. The tariff data server may collect its own carrier performance data and make this data available to local computer 254 via downloading.

User interface 276 functions to provide setup screens for entering and updating subscriber supplied parameters. The data entered by the subscriber comprises the subscriber's name, address, organization, user ID, license size (i.e., number of line units) including serial numbers, monitored telephone numbers, e-mail address, main account number, primary carrier/OCP including start date, secondary carrier/OCPs numbered 1 through N including start date, initial long distance call volume, normal 1-800 call volume, normal credit card call volume, registration date, preferred telephone, NPA, country, contact telephone number, contact facsimile number. In addition, user interface 276 displays a call progress report which includes the following information: last used OCP, call destination (telephone number and text), cost and savings for the current and last call.

Reporting module 334 functions to generate the following reports: a savings report, a call accounting report and an unsuccessful call report. The savings report specifies the saving achieved by using the call management system compared to using the default carrier or primary interexchange carrier (PIC) (i.e., if the call management system was not used). The savings report shows the total saving last month, accumulated saving since the call management system was installed and the calls routed by carriers other than the default (PIC) and the saving for each call for the last month. The call accounting report includes the details of successful calls. The calls are grouped by OCP and appear in calendar order. The call accounting report shows the called destination number, destination city, date, time of day, duration, cost and associated line unit. Various queries may be made to view various call accounting information. The unsuccessful call report is typically used by a subscriber to inhibit usage of low performance and low quality carriers. This report enables monitoring of the grade of service among competitive carriers. The report includes the details of calls which have not been completed due to congestion or no detection of ring or busy tone after digits are dialed. Calls on this report are grouped by carrier. Each entry in the report includes called destination number, destination city, data, time of day, call duration and line unit in use.

Line unit interface 284, coupled to processor 272, functions to provide the interface between processor 272 and the one or more line units 258 installed in the system. Both wired and wireless communication links are supported by line unit interface 284. To support a wired link, line unit interface 284 comprises a conventional RS-232 interface, well known in the art. For wireless links, line unit interface 284 comprises a suitable conventional wireless link such as RF or infrared, also well known in the art. Each line unit interface 284 maintains a communications link with each of the line units in the system.

Least cost router 274, as described previously, determines, for each call, the least cost carrier/OCP and provides to the line unit the necessary access dialing string along with the number to dial. The input parameters to the least cost router are the following: basic rates including initial period and additional period, caller location (i.e., what carriers and what calling plans are available in the caller's location and what exchanges are considered local), destination mileage and resulting rate steps, billing scheme including initial period duration and additional period, call jurisdiction (i.e., local call, intraLATA, interLATA/intrastate, interstate, international), billing scheme (i.e., mileage dependent, flat rate, band), date and time of day dependency, day of week/year dependency, expected call duration, statistics of call duration (i.e., caller's calling habits), volume discounts, aggregate volume discount for all lines associated with the same main billing account (MBA), volume and discount commitment, promotions in effect, block of time (i.e., a certain amount of time is at a reduced rate during a discount period, e.g. AT & T's Reach Out America calling program), prepaid or free volume, volume commitments, concatenated OCPs for volume discount calculation, taper (i.e., different price for different level of consumption) and discounted countries, area codes, telephone numbers (i.e., MCI's 'friends and family' OCP), free day dialing, discounted country, NPA, numbers, 1-800 normal volume, credit card call normal volume. Some calls are not modified by the LCR mechanism and are returned to the line unit as dialed. For example numbers with a non-legal NPA, unsupported country codes and NPA/NXXs for which no rate table exists (i.e., 1-800, 1-900, emergency services, collect calls, etc.).

Processor 272 executes one or more ongoing client processes within the local client computer. A call process in the processor is a real time event driven process that includes the following: line monitoring, digit collection and analysis, least cost routing process, line unit interface, call progress display and call logging. Line monitoring is active during all the phases of a call and includes the monitoring of all line units in the system. The line monitoring process receives telephone line status information from each line unit, arranges the data according to line unit and receives the status of each line unit itself, thus obtaining information on all dialed digits and on call start and end information. It maintains communications with each line unit and periodically sends 'keep alive' messages to each line unit. In addition, dialed digits are collected during the call and are reported to the call logging process.

The digit collection and analysis is evoked by the telephone set going off-hook. Once dialed, the call progress display dynamically updates the following information for the user or subscriber: the dialed number, destination city, carrier's identity, call progress phase, call duration, call accumulated dynamic cost and call accounting dynamic saving. The call logging process logs calls which have and have not been processed by the least cost router, faulty calls in which no connection was established (i.e., no ring or busy tone, call was too short, congestion tone, too establishment time was too long, call flagged as bad by subscriber, etc.).

In addition to a call process, processor 272 executes time driven processes which include volume calculation per carrier and the carrier quality and performance assessment process, discussed previously. The volume calculation includes calculating the volume of each carrier's OCP on a monthly basis and computing an average. The calculated average volume is used to determine the expected volume per carrier and to recalculate the pointer to the volume discount entry. In addition, a process performed weekly calculates the expected volume according to the following formula:

expected volume=accumulated volume/percentage of the month passed

Calculating the expected volume helps to eliminate cases where a monthly peak or changes in the usage of a carrier will cause new volumes. If weekly expected volumes differ from the average monthly volume, the appropriate OCPs are updated accordingly. The carrier performance control process decides, on a periodic basis, whether to drop a particular carrier from use. The decision is based on data collected automatically and entered manually by the subscriber, as described previously. In addition, the expiration data of promotions are tracked on a daily basis. The expiration data of each promotion is included in the OCP parameter data.

It is noted that alternative call management system embodiments may be constructed using any combination of least cost routing unit 274, call accounting unit 332 and carrier performance monitoring unit 330. A preferred call management system embodiment, however, comprises all three units: least cost routing unit 274, call accounting unit 332 and carrier performance monitoring unit 330.

Figure 12:
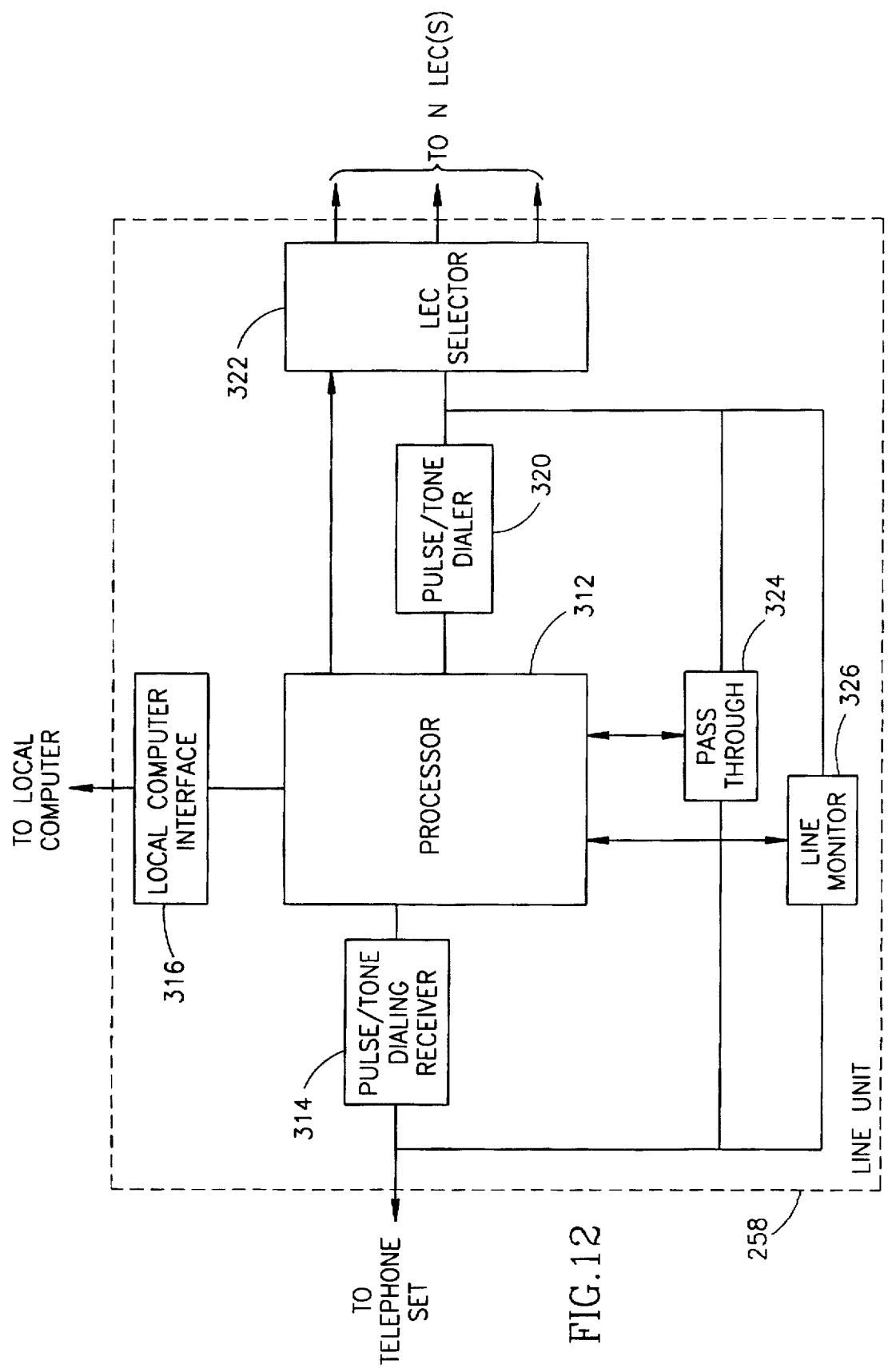
FIG. 12 is a detailed block diagram illustrating the line unit of the present invention.

Line unit 258 will now be described in more detail. The line unit is positioned between the subscriber's telephone set and the telephone network. As previously disclosed, each line unit maintains a communication link to the local client computer. All digits dialed by the subscriber after the telephone goes off-hook are passed to the local client computer. For calls not relevant to the least cost router, the local client computer returns the dialed number to the line unit as dialed. The line unit, in turn, transmits those digits to the telephone network. An example of calls ignored by the least cost router are: 1-800 calls, 1-888 calls, emergency services (i.e., 911, etc.) and calls to operators (i.e., 0, 0+, 411, etc.). Illustrated in FIG. 12 is a detailed block diagram of the line unit portion of the call management system. Line unit 258 comprises a processor 312 coupled to a pulse/tone or ISDN dialing receiver 314, a local client computer interface 316, a LEC selector 322, a pulse/tone or ISDN dialer 320, a pass through module 324 and a line monitor 326. Processor 312 functions to control the internal operation of line unit 258. Pulse/tone dialing receiver 314 is coupled to the telephone set and functions to receive and interpret the digits dialed by the subscriber via the telephone set. The intercepted digits are sent to processor 312 further handling. Local client computer interface 316 is adapted to provide a wired or wireless communication link to the local client computer. For wired links, local client computer interface implements a standard RS-232 interface, well known in the art. If a wireless link is used between the line unit and the local client computer, a standard RF or infrared communication link is implemented, also well known in the art. The line unit interface 284 (FIG. 11) in the local client computer is adapted to handle multiple line units by implementing a protocol similar to carrier sense multiple access with collision detection (CSMA/CD), the scheme used in standard Ethernet networks.

Pulse/tone or ISDN dialer 320 is coupled to processor 312 and receives strings of digits to be dialed onto the telephone line. Pulse/tone or ISDN dialer 320 is coupled to LEC selector 322. LEC selector 322 couples the output of pulse/tone or ISDN dialer 320 to one or more LECs. A control signal from processor 312 determines which LEC the output of pulse/tone or ISDN dialer 320 is coupled to. The telephone line from the LEC, via LEC selector 322, is also coupled to pass through 324 which functions to become transparent when line unit 258 is not-active (i.e., powered down). The default state of pass through 324 is to act transparent to the line. In this state, digits dialed by a subscriber are passed transparently through to the telephone line. The state of pass through 324 can be controlled via processor 312.

Line monitor 326, coupled between the telephone set and the telephone line, functions to monitor the telephone line on both sides of the pass through at all times. When an off-hook condition and subsequent dial tone signal is detected on the line, processor 312 opens up pass through 324, disconnecting the telephone set from the telephone network and sends an 'off-hook' signal to the local client computer. The line monitor monitors the line and transfers network signals to the telephone set. All digits dialed will be captured by pulse/tone dialing receiver 314, prevented from being transmitted on the telephone line and reported to the local client computer until a connect command is received. Upon receipt of a connect command, processor 312 puts pass through 324 into the transparent state, coupling the telephone set to the telephone network. After a connect line command is received, line monitor listens for the following events and responds with an associated action: call answered (i.e., the called party answered the call)—a 'voice' message is sent to the local client computer; a dial tone cadence—a 'dial tone' message is sent to the local client computer; a ring cadence—a 'ring' message is sent to the local client computer; a busy cadence—a 'busy' message is sent to the local client computer; a congestion cadence—a 'congestion' message is sent to the local client computer. The above list is only presented as an example, other tones may also be included depending on the application.

Figure 13:
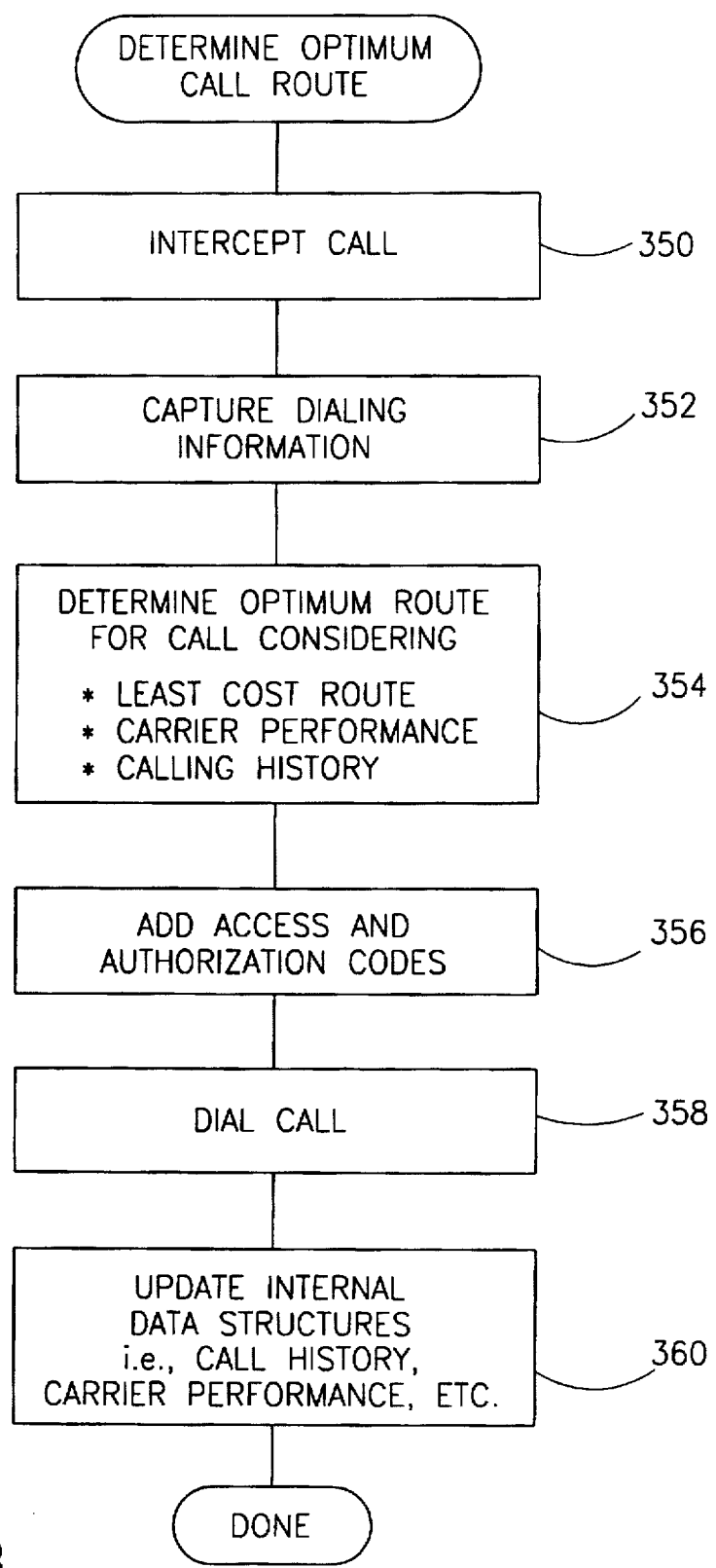
FIG. 13 is a flow chart illustrating a method of real time call routing using the call management system of the present invention.

A flow chart illustrating a method of real time call routing using the call management system of the present invention is shown in FIG. 13. Although each step of the process has been previously disclosed in detail above, the flow chart illustrated in FIG. 13 is never the less useful in understanding the method of the present invention. First, the call dialed by the user is intercepted either by PBX 120 (FIG. 2) or line unit 258 (FIGS. 6 to 8) (step 350). The dialing information input by the user is captured and stored (step 352). Then, the optimum route or path for the call is then determined (step 354). Either any or all of the following factors may be factored into the decision as to with which carrier to place the call: (1) least cost route for the call, (2) locally derived or downloaded carrier performance data or (3) the calling history of the user. After the optimum call is determined, any access and/or authorization codes are added to the dialed string (step 356). The call is then dialed (step 358). Internal data structures are then appropriately updated to take into account the call just dialed (step 360).

While the invention has been described with respect to a limited number of embodiments, it will be appreciated that many variations, modifications and other applications of the invention may be made.

What is claimed is:

1. A call management system for determining an optimum route for a telephone call made by a subscriber, said telephone call routed through one of N local exchange carriers coupled to said system via K telephone lines, each local exchange carrier coupled to one of M long distance carriers, the system comprising:

a tariff data server for managing a database containing tariff related information on local and long distance carriers, local exchange, telephone exchange location related data and subscribers;

a first communication link coupling said tariff data server to a local client computer;

said local client computer for maintaining a client database containing tariff information relevant to the location of said subscriber, optional calling plans subscribed to or optional calling plans accessible from the location of said subscriber, said local client computer for determining said optimum route;

at least one line unit coupled to a telephone set, said N local exchange carriers and said local client computer, said at least one line unit for intercepting digits dialed by said subscriber, monitoring one of said K telephone lines, receiving a dialing string from said local client computer corresponding to said optimum route and transmitting said dialing string onto said one of said K telephone lines; and a second communication link coupling said local client computer to said at least one line unit.

2. The system according to claim 1, wherein said tariff data server comprises:

a processor for controlling the operation of said tariff data server;

a server database interface coupled to said processor, said server database interface for fulfilling database requests issued by said processor;

a server database coupled to said server database interface, said server database containing tariff related information on local and long distance carriers; and a client communications module coupled to said processor and to said first communication link, said client communications module for managing communications between said processor and said local client computer.

3. The system according to claim 2, wherein said tariff data system comprises:

a report generation system coupled to said processor, said report generation system for producing reports from data collected by said system both automatically and manually; and a subscriber interface coupled to said processor, said subscriber interface for managing the collection and maintenance of subscriber supplied data.

4. The system according to claim 2, wherein said server database comprises:

an optional calling plan database coupled to said server database interface;

a distance/local exchange database coupled to said server database interface;

a carrier access database coupled to said server database interface;

a subscriber database coupled to said server database interface; and a client database coupled to said server database interface.

5. The system according to claim 1, wherein said first communication link comprises a telephone line.

6. The system according to claim 1, wherein said first communication link comprises the Internet.

7. The system according to claim 1, wherein said local client computer comprises:

a processor for managing the operation of said local client computer;

a client database update module coupled to said processor, said client database update module receiving and processing database downloads from said tariff data server;

a line unit interface coupled to said processor, said line unit interface for coupling said processor to said at least one line unit;

at least cost router coupled to said processor, said least cost router for determining the optimum route for a call placed by said subscriber, said least cost router returning a carrier dialing string to route said call accordingly;

a user interface coupled to said processor, said user interface for providing an interface between said processor and said subscriber;

a client database holding tariff data relevant to the location of said subscriber and calling preferences of said subscriber;

a client database interface coupled to said processor, said client database interface providing an interface between said processor and said client database;

a call accounting module coupled to said processor, said call accounting module logging calls placed by said subscriber and determining subscriber call characteristics; and a carrier quality and performance monitoring module coupled to said processor, said carrier quality and performance monitoring module for managing the selection of said long distance carriers based on quality and performance of their connections.

8. The system according to claim 7, further comprising a reporting module coupled to said processor.

9. The system according to claim 1, wherein said second communication link comprises an RS-232 link coupling said local client computer to said at least one line unit.

10. The system according to claim 1, wherein said second communication link comprises a wireless radio frequency link coupling said local client computer to said at least one line unit.

11. The system according to claim 1, wherein said second communication link comprises a wireless infrared link coupling said local client computer to said at least one line unit.

12. The system according to claim 1, wherein said at least one line unit comprises:

a processor for controlling the operation of said line unit;

a dialing receiver coupled to said processor, said dialing receiver intercepting digits dialed by said subscriber and transferring said digits to said processor;

a dialer coupled to said processor, said dialer receiving a dialing string from said processor and causing said dialing string to be dialed onto one of said K telephone lines;

a local client computer interface coupled to said processor, said local client computer interface providing the interface between said processor and said local client computer;

a pass through coupled to said processor, said pass through having a first and second state, both said first and said second states controlled by said processor, said first state blocking said telephone set from said one of said K telephone lines, said second state coupling said telephone set to said one of said K telephone lines;

a line monitor coupled to said processor, said line monitor detecting and interpreting signals occurring on said one of said K telephone lines; and a local exchange selector coupled to said dialer, said processor and said N local exchange carriers via said K telephone lines, said local exchange carrier coupling said dialer to one of said N local exchange carriers in accordance with a control signal produced by said processor.

13. The system according to claim 12, wherein said dialing receiver detects and decodes pulse and dual tone multiple frequency tones.

14. The system according to claim 12, wherein said dialing receiver detects and decodes Integrated Digital Network Services (ISDN) signaling information.

15. A call management system for determining an optimum route for telephone calls made by users of a private branch exchange (PBX), each of said telephone calls routed through one of N local exchange carriers coupled to said system via K trunk lines, each local exchange carrier coupled to one of M long distance carriers, the system comprising:

a tariff data server for managing a database containing tariff related information on local and long distance carriers;

a first communication link coupling said tariff data server to a local client computer;

said local client computer for maintaining a client database containing tariff information relevant to the location of said subscriber, optional calling plans subscribed to or optional calling plans accessible from the location of said subscriber, said local client computer for determining said optimum route;

at least one line unit coupled between a user's telephone set and one of said K trunk lines, said at least one line unit coupled to said local client computer, said at least one line unit for intercepting digits out pulsed by said PBX, monitoring one of said K trunk lines and receiving a dialing string from said local client computer corresponding to said optimum route and transmitting said dialing string to said one of said K trunk lines; and a second communication link coupling said local client computer to said at least one line unit.

16. The system according to claim 15, wherein said tariff data server comprises:

a processor for controlling the operation of said tariff data server;

a server database interface coupled to said processor, said server database interface for fulfilling database requests issued by said processor;

a server database coupled to said server database interface, said server database containing tariff related information on local and long distance carriers; and a client communications module coupled to said processor and to said first communication link, said client communications module for managing communications between said processor and said local client computer.

17. The system according to claim 16, wherein said tariff data system comprises:

a report generation system coupled to said processor, said report generation system for producing reports from data collected by said system both automatically and manually; and a subscriber interface coupled to said processor, said subscriber interface for managing the collection and maintenance of subscriber supplied data.

18. The system according to claim 16, wherein said server database comprises:

an optional calling plan database coupled to said server database interface;

a distance/local exchange database coupled to said server database interface;

an access database coupled to said server database interface;

a subscriber database coupled to said server database interface; and a client database coupled to said server database interface.

19. The system according to claim 15, wherein said first communication link comprises a telephone line.

20. The system according to claim 15, wherein said first communication link comprises the Internet.

21. The system according to claim 15, wherein said local client computer comprises:

a processor for managing the operation of said local client computer;

a client database update module coupled to said processor, said client database update module receiving and processing database downloads from said tariff data server;

a line unit interface coupled to said processor, said line unit interface for coupling said processor to said at least one line unit;

at least cost router coupled to said processor, said least cost router for determining the optimum route for a call placed by said subscriber, said least cost router returning a carrier dialing string to route said call accordingly;

a user interface coupled to said processor, said user interface for providing an interface between said processor and said subscriber;

a client database holding tariff data relevant to the location of said subscriber and calling preferences of said subscriber;

a client database interface coupled to said processor, said client database interface providing an interface between said processor and said client database;

a call accounting module coupled to said processor, said call accounting module logging calls placed by said subscriber and determining subscriber call characteristics; and a carrier performance monitoring module coupled to said processor, said carrier performance monitoring module for managing the selection of said long distance carriers based on the quality and performance of their connections.

22. The system according to claim 21, further comprising a reporting module coupled to said processor.

23. The system according to claim 15, wherein said second communication link comprises an RS-232 link coupling said local client computer to said at least one line unit.

24. The system according to claim 15, wherein said second communication link comprises a wireless radio frequency link coupling said local client computer to said at least one line unit.

25. The system according to claim 15, wherein said second communication link comprises a wireless infrared link coupling said local client computer to said at least one line unit.

26. The system of claim 15, wherein said at least one line unit comprises:

a processor for controlling the operation of said line unit;

a dialing receiver coupled to said processor, said dialing receiver intercepting digits dialed by said subscriber and transferring said digits to said processor;

a dialer coupled to said processor, said dialer receiving a dialing string from said processor and causing said dialing string to be dialed onto one of said K trunk lines;

a local client computer interface coupled to said processor, said local client computer interface providing the interface between said processor and said local client computer;

a pass through coupled to said processor, said pass through having a first and second state, both said first and said second states controlled by said processor, said first state blocking said telephone set from said one of said K trunk lines, said second state coupling said telephone set to said one of said K trunk lines;

a line monitor coupled to said processor, said line monitor detecting and interpreting signals occurring on said one of said K trunk lines; and a local exchange selector coupled to said dialer, said processor and said N local exchange carriers via said K trunk lines, said local exchange carrier coupling said dialer to one of said N local exchange carriers in accordance with a control signal produced by said processor.

27. The system according to claim 26, wherein said dialing receiver detects and decodes pulse and dual tone multiple frequency tones.

28. The system according to claim 26, wherein said dialing receiver detects and decodes Integrated Digital Network Services (ISDN) signaling information.

* * * * *